(12) United States Patent
Yug et al.

(10) Patent No.: US 12,393,230 B2
(45) Date of Patent: Aug. 19, 2025

(54) DISPLAY DEVICE AND METHOD OF MANUFACTURING THE SAME

(71) Applicant: SAMSUNG DISPLAY CO., LTD., Yongin-si (KR)

(72) Inventors: Geunwoo Yug, Seoul (KR); Muhyun Kim, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 721 days.

(21) Appl. No.: 17/827,598

(22) Filed: May 27, 2022

(65) Prior Publication Data

US 2022/0291721 A1    Sep. 15, 2022

Related U.S. Application Data

(62) Division of application No. 16/843,710, filed on Apr. 8, 2020, now Pat. No. 11,347,269.

(30) Foreign Application Priority Data

Apr. 16, 2019 (KR) .................. 10-2019-0044318

(51) Int. Cl.
| | |
|---|---|
| *G06F 1/16* | (2006.01) |
| *G02B 1/12* | (2006.01) |
| *G02B 1/14* | (2015.01) |
| *G09F 9/30* | (2006.01) |
| *H04M 1/02* | (2006.01) |

(52) U.S. Cl.
CPC ............ *G06F 1/1652* (2013.01); *G02B 1/12* (2013.01); *G02B 1/14* (2015.01); *G06F 1/1626* (2013.01); *G09F 9/301* (2013.01); *H04M 1/0268* (2013.01)

(58) Field of Classification Search
CPC .... G06F 1/1652; G06F 1/1641; G06F 1/1616; G06F 1/1637; G06F 1/1681; G06F 1/1626; G06F 1/1643; G06F 1/1656
USPC ............ 219/121.67, 121.68, 121.69, 121.72, 219/121.85
See application file for complete search history.

(56) References Cited

U.S. PATENT DOCUMENTS

| | | |
|---|---|---|
| 8,383,983 B2 | 2/2013 | Lee et al. |
| 8,932,510 B2 | 1/2015 | Li et al. |
| 9,354,476 B2 | 5/2016 | Han et al. |
| 10,280,113 B2 | 5/2019 | Masuda |
| 10,326,113 B2 | 6/2019 | Yug |
| 10,621,909 B2 | 4/2020 | Kwon et al. |
| 10,688,756 B2 | 6/2020 | Chu et al. |

(Continued)

FOREIGN PATENT DOCUMENTS

| | | |
|---|---|---|
| CN | 102574246 A | 7/2012 |
| CN | 105764863 A | 7/2016 |

(Continued)

*Primary Examiner* — Chris Q Liu
(74) *Attorney, Agent, or Firm* — Womble Bond Dickinson (US) LLP

(57) ABSTRACT

A display device includes a display panel for displaying an image, and including a folding area configured to be folded about a folding axis, and a non-folding area adjacent to the folding area, and also includes a window on the display panel, including a flexible material, and configured to be folded along the display panel, wherein a side surface of the window has a first surface roughness in the non-folding area, and has a second surface roughness in the folding area that is less than the first surface roughness.

10 Claims, 17 Drawing Sheets

(56) References Cited

U.S. PATENT DOCUMENTS

| | | | |
|---|---|---|---|
| 10,863,632 B2 | 12/2020 | Choi | |
| 10,941,070 B2 | 3/2021 | Altman et al. | |
| 10,983,562 B2 | 4/2021 | Cho et al. | |
| 11,061,439 B2 | 7/2021 | Kwon et al. | |
| 11,158,834 B2 | 10/2021 | Ha | |
| 11,773,004 B2 | 10/2023 | Hackert et al. | |
| 2014/0145977 A1* | 5/2014 | Kang | G06F 3/0446 345/173 |
| 2014/0175684 A1 | 6/2014 | Hassan | |
| 2014/0285953 A1* | 9/2014 | Hirai | G06F 1/1637 361/679.01 |
| 2015/0227172 A1* | 8/2015 | Namkung | H10K 59/40 345/173 |
| 2015/0261041 A1* | 9/2015 | Choi | G02F 1/133605 362/346 |
| 2015/0266272 A1 | 9/2015 | Lee et al. | |
| 2016/0066411 A1* | 3/2016 | Hong | H05K 1/0283 174/254 |
| 2016/0108283 A1 | 4/2016 | Oh et al. | |
| 2016/0252991 A1* | 9/2016 | Kim | G06F 1/1656 345/173 |
| 2017/0123461 A1 | 5/2017 | Kim et al. | |
| 2017/0262022 A1* | 9/2017 | Choi | G06F 1/1652 |
| 2018/0022013 A1* | 1/2018 | Choi | B32B 37/12 156/196 |
| 2018/0074358 A1 | 3/2018 | Jeon et al. | |
| 2018/0096635 A1 | 4/2018 | Park et al. | |
| 2018/0134007 A1* | 5/2018 | Lee | B32B 25/20 |
| 2018/0147818 A1* | 5/2018 | Ryu | B32B 15/04 |
| 2018/0151845 A1* | 5/2018 | Jeong | H10K 71/00 |
| 2018/0299603 A1* | 10/2018 | Lee | H10K 77/111 |
| 2018/0308903 A1* | 10/2018 | Jeong | H10K 59/40 |
| 2018/0352664 A1 | 12/2018 | Park et al. | |
| 2019/0181389 A1 | 6/2019 | Joo et al. | |
| 2020/0004364 A1 | 1/2020 | Jung et al. | |
| 2020/0251679 A1 | 8/2020 | Ha et al. | |
| 2020/0319672 A1 | 10/2020 | Kim et al. | |
| 2020/0324521 A1 | 10/2020 | Park et al. | |
| 2020/0329575 A1 | 10/2020 | Park et al. | |
| 2020/0333845 A1 | 10/2020 | Yug et al. | |
| 2021/0028391 A1 | 1/2021 | Yug et al. | |
| 2021/0034118 A1 | 2/2021 | Lee et al. | |
| 2021/0034180 A1 | 2/2021 | Hirotsugu et al. | |
| 2021/0041601 A1 | 2/2021 | Oh et al. | |
| 2021/0043858 A1 | 2/2021 | Choi et al. | |
| 2021/0095168 A1 | 4/2021 | Kishimoto | |
| 2021/0276131 A1 | 9/2021 | Yug | |
| 2021/0293997 A1 | 9/2021 | Kim et al. | |

FOREIGN PATENT DOCUMENTS

| | | |
|---|---|---|
| CN | 106458693 A | 2/2017 |
| CN | 107922237 A | 4/2018 |
| EP | 3330782 A1 | 6/2018 |
| JP | 2019-504812 | 2/2019 |
| KR | 10-1041137 B1 | 6/2011 |
| KR | 10-2014-0064366 A | 5/2014 |
| KR | 10-2015-0017819 A | 2/2015 |
| KR | 10-2015-0139488 A | 12/2015 |
| KR | 10-2018-0036304 A | 4/2018 |
| KR | 10-2018-0063936 A | 6/2018 |
| KR | 10-2018-0109012 A | 10/2018 |
| KR | 10-1922922 B1 | 11/2018 |

* cited by examiner

DISPLAY DEVICE AND METHOD OF MANUFACTURING THE SAME

CROSS-REFERENCE TO RELATED APPLICATIONS

This application is a divisional of U.S. patent application Ser. No. 16/843,710, filed Apr. 8, 2020, which claims priority to and the benefit of Korean Patent Application No. 10-2019-0044318, filed Apr. 16, 2019, the entire content of both of which is incorporated herein by reference.

BACKGROUND

1. Field

Embodiments of the present disclosure relate to a display device, such as a foldable display device, and a method of manufacturing the display device.

2. Description of the Related Art

Electronic devices, such as a smart phone, a table computer, a notebook computer, and a smart television set, have been developed. Such electronic devices include a display device to provide information, and include various electronic modules in addition to the display device.

In recent years, a display device including a flexible display member and being configured to be foldable or rollable is being developed. In contrast to a flat display device, the flexible display device may be folded, rolled, or curved like paper. The flexible display device, which is capable of being transformed into various shapes, is easy to carry and improves a user's convenience.

SUMMARY

Embodiments of the present disclosure provide a foldable display device having improved reliability. Embodiments of the present disclosure also provide a method of manufacturing the foldable display device.

Embodiments of the inventive concept provide a display device including a display panel for displaying an image, and including a folding area configured to be folded about a folding axis, and a non-folding area adjacent to the folding area, and a window on the display panel, including a flexible material, and configured to be folded along the display panel, wherein a first side surface portion of the window disposed in the non-folding area has a first surface roughness, and a second side surface portion of the window in the folding area has a second surface roughness that is less than the first surface roughness.

The window may include a plurality of layers sequentially stacked in a stacking direction, wherein a side surface of each of the plurality of layers has higher surface roughness in the non-folding area than in the folding area.

A side surface of at least one layer among the plurality of layers may be located at a first height range from a reference surface that is substantially parallel to the stacking direction in the non-folding area, and may be located at a second height range from the reference surface in the folding area, the second height range being less than the first height range.

The window may include a base layer, a window functional layer on the base layer, and a window protective layer covering the window functional layer, wherein the base layer, the window functional layer, and the window protective layer are sequentially stacked.

Each of the first and second side surface portions of the window may include a side surface of the base layer, a side surface of the window functional layer, and a side surface of the window protective layer.

The display device may further include a functional layer between the display panel and the window.

A first side surface of the functional layer disposed in the non-folding area may have a third surface roughness, and a second side surface of the functional layer disposed in folding area may have a fourth surface roughness that is less than the third surface roughness.

The display device may further include a protective film on a rear surface of the display panel.

The display panel may be a flexible display panel.

Embodiments of the inventive concept provide a method of manufacturing a display device including a display panel for displaying an image, and including a folding area configured to be folded about a folding axis and a non-folding area adjacent to the folding area, and a window on the display panel, including a flexible material, and configured to be folded along the display panel, the method including preparing a preliminary display module including a valid area and an invalid area, which are distinguished from each other with respect to a cutting line, performing a first laser process along a first cutting line in the non-folding area of the cutting line to separate a first portion of the invalid area from the valid area, and performing a second laser process along a second cutting line in the folding area of the cutting line to separate a second portion of the invalid area from the valid area.

Performing the second laser process may include irradiating a second laser beam having an energy that is lower than a first laser beam used in the first laser process.

Performing the first laser process may include repeatedly irradiating the first laser beam N times, and performing the second laser process may include repeatedly irradiating the second laser beam M times, M having a value within a range from about 3N to about 3.5N.

Performing the first laser process may include irradiating the first laser beam at a first speed, and performing the second laser process may include irradiating the second laser beam at a second speed that is faster than the first speed.

Performing the first laser process may include irradiating a first laser beam along the first cutting line on a rear surface of the preliminary display module, and performing the second laser process may include irradiating a second laser beam along the second cutting line on the rear surface of the preliminary display module.

A first side surface portion of the window disposed in the non-folding area may have a first surface roughness and a second side surface portion of the window disposed in the folding area may have a second surface roughness that is less than the first surface roughness.

The window may include a plurality of layers sequentially stacked in a stacking direction, wherein a side surface of each of the plurality of layers has higher surface roughness in the non-folding area than in the folding area.

A side surface of at least one layer among the layers may be located at a first height range from a reference surface that is substantially parallel to the stacking direction in the non-folding area, and may be located at a second height range from the reference surface in the folding area, the second height range being less than the first height range.

The window may include a base layer, a window functional layer on the base layer, and a window protective layer covering the window functional layer.

Each of the first and second side surface portions of the window may include a side surface of the base layer, a side surface of the window functional layer, and a side surface of the window protective layer.

The display device may further include a functional layer between the display panel and the window, a first side surface of the functional layer in the non-folding area may have a third surface roughness, and a second side surface of the functional layer disposed in the folding area may have a fourth surface roughness that is less than the third surface roughness.

According to the above, in contrast to the laser process for the cutting line located in the non-folding area, the laser process for the cutting line located in the folding area may be performed by using a low energy laser beam during the laser process of cutting the preliminary display module.

Therefore, stress applied to the side surface of the folding area, and damage that may be caused to the side surface of the folding area during the cutting process, may be reduced or eliminated. As a result, defects in the folding area may be reduced, and a product reliability of the foldable display device may be improved.

BRIEF DESCRIPTION OF THE DRAWINGS

The above and other aspects of the present disclosure will become readily apparent by reference to the following detailed description when considered in conjunction with the accompanying drawings wherein.

DETAILED DESCRIPTION

Figure 1:
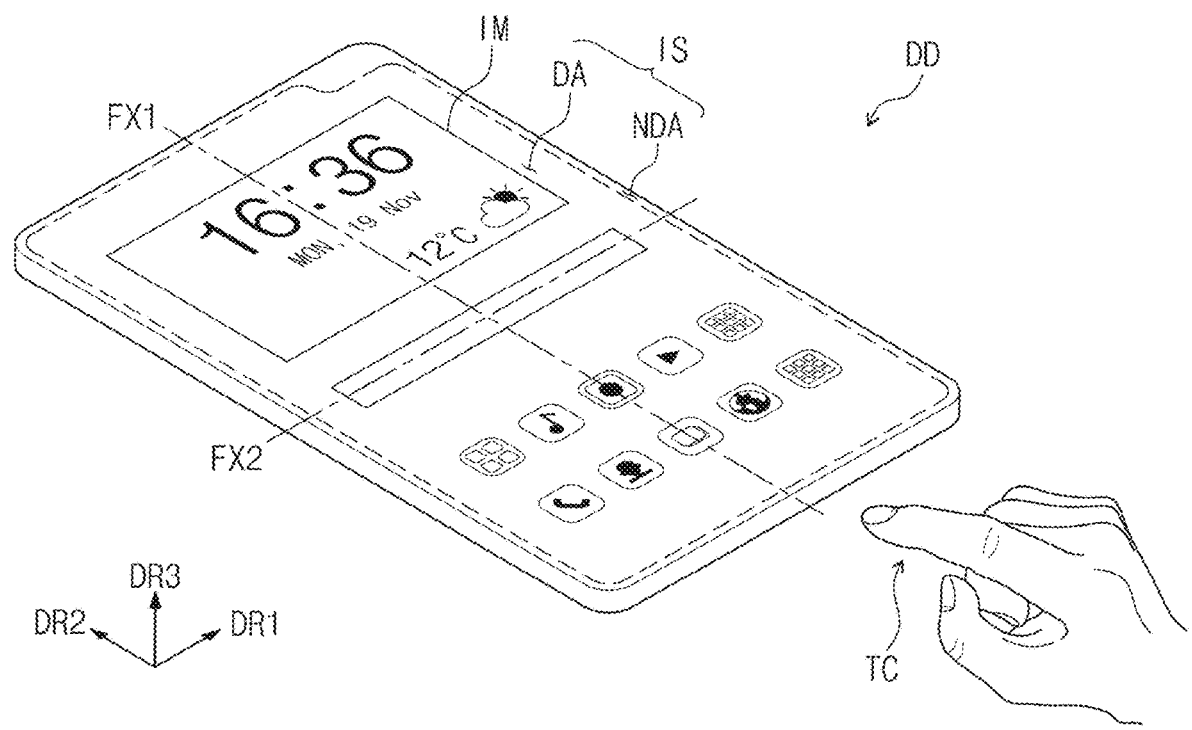
FIG. 1 is a perspective view showing a display device according to an embodiment of the present disclosure.

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

In the examples, the first direction, the second direction, and/or the third direction are not limited to three axes of a rectangular coordinate system, and may be interpreted in a broader sense. For example, the first, second, and third directions may be perpendicular to one another, or may represent different directions that are not perpendicular to one another.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

Also, any numerical range disclosed and/or recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein. All such ranges are intended to be inherently described in this specification such that amending to expressly recite any such subranges would comply with the requirements of 35 U.S.C. § 112(a) and 35 U.S.C. § 132(a).

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a perspective view showing a display device DD according to an embodiment of the present disclosure.

Referring to FIG. 1, the display device DD has a rectangular shape with short sides in a first direction DR1 and long sides in a second direction DR2 crossing the first direction DR1. However, the shape of the display device DD should not be limited to the rectangular shape, and the display device DD may have various shapes in other embodiments.

The display device DD may be a foldable electronic device. For example, the display device DD according to the present embodiment may be folded about folding axes FX1 and FX2, which may respectively extend in predetermined directions. Hereinafter, a state in which the display device DD is folded about the folding axes FX1 and FX2 is referred to as a "folding state," and a state in which the display device DD is not folded is referred to as a "non-folding state."

The folding axes FX1 and FX2 may respectively extend in the first direction DR1 or the second direction DR2. In the present embodiment, the folding axis extending in the second direction DR2 is referred to as a "first folding axis" FX1, and the folding axis extending in the first direction DR1 is referred to as a "second folding axis" FX2. In other embodiments, the display device DD may include only one folding axis of the first and second folding axes FX1 and FX2. The display device DD may be folded about one of the first and second folding axes FX1 and FX2.

The display device DD according to the present embodiment may be applied to a large-sized electronic item, such as a television set and/or a monitor, and may be applied to a small and/or medium-sized electronic item, such as a mobile phone, a tablet computer, a car navigation unit, and/or a game unit. However, these are merely examples, and thus the display device DD may be applied to other electronic items as long as they do not depart from the concept of the present disclosure.

As shown in FIG. 1, the display device DD may display an image IM on a display surface IS, which is substantially parallel to each of the first and second directions DR1 and DR2, the image IM being displayed toward a third direction DR3. The display surface IS on which the image IM is displayed may correspond to a front surface of the display device DD.

The display surface IS of the display device DD may be divided into a plurality of areas. The display surface IS of the display device DD may include a display area DA and a non-display area NDA, which are defined therein.

The display area DA may be an area on which the image IM is displayed, and a user may recognize the image IM through the display area DA. The display area DA may have a quadrangular shape. The non-display area NDA may surround the display area DA. Accordingly, the display area DA may have a shape defined by the non-display area NDA. However, this is merely an example, and the non-display area NDA may be located adjacent to only one side of the display area DA, or may be omitted entirely. The display device DD according to the present embodiment may include various embodiments, and, it should not be limited to a particular embodiment.

In the present embodiment, the non-display area NDA is an area adjacent to the display area DA, and the image IM is not displayed on the non-display area NDA. Also, the display device DD has a bezel area defined by the non-display area NDA.

The non-display area NDA may surround the display area DA; however, this is merely an example. The non-display area NDA may be located adjacent to only a portion of an edge of the display area DA, and it should not be limited to a particular embodiment.

The display device DD according to the present embodiment may sense a user input TC (or "external input) applied thereto from the outside. The user input TC includes various forms of external inputs, such as a portion of the user's body, light, heat, or pressure. In the present embodiment, the user input TC is shown as a user's hand applied to the front surface, however, this is merely an example. As described above, the user input TC may be provided in various forms, and the display device DD may sense the user input TC applied to a side surface or to a rear surface of the display device DD depending on a structure of the display device DD, however, they should not be limited to a particular embodiment.

The display device DD may activate the display surface IS to display the image IM while sensing the external input TC. In the present embodiment, an area where the external input TC is sensed may be defined in the display area DA on which the image IM is displayed. However, this is merely an example, and the area where the external input TC is sensed may be defined in the non-display area NDA, or may be defined over the entire display surface IS.

Figure 2A:
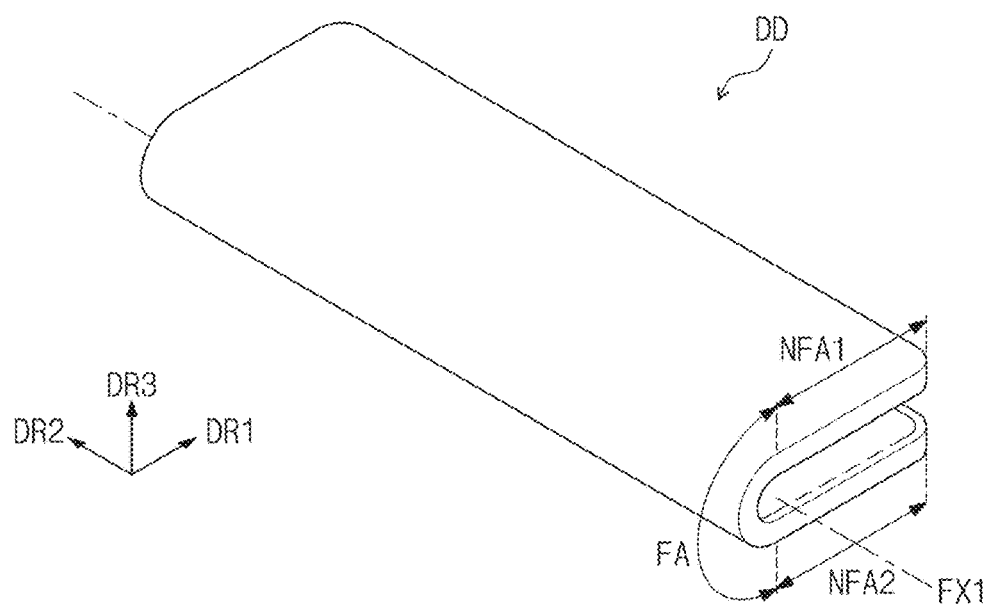
FIG. 2A is a perspective view showing a state in which the display device shown in FIG. 1 is inwardly folded (in-folding) about a first folding axis.
Figure 2B:
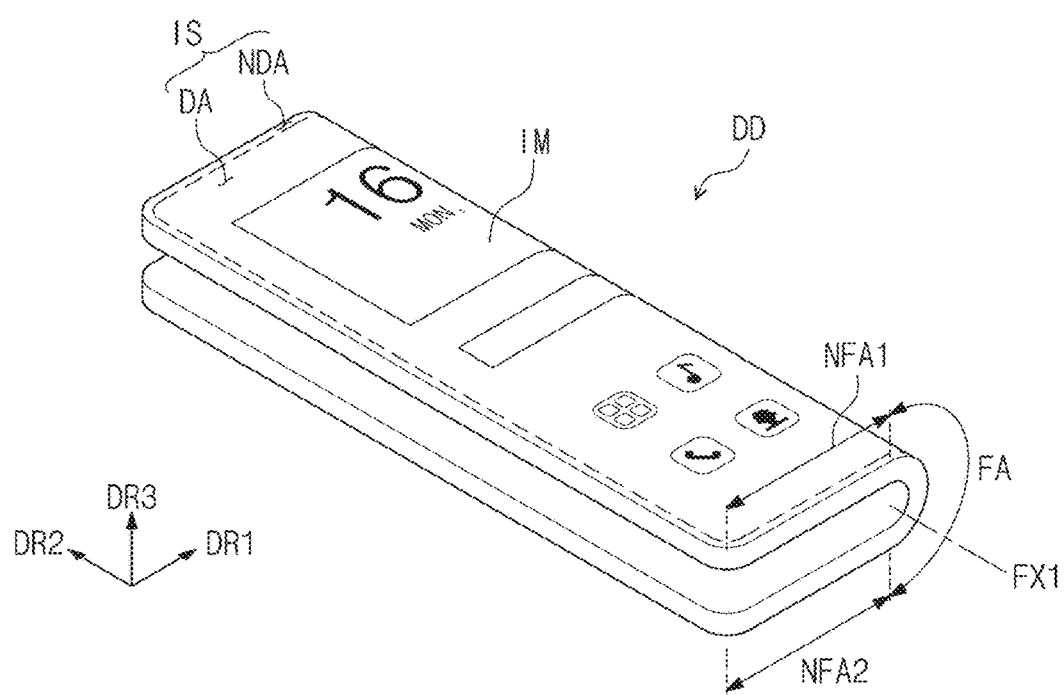
FIG. 2B is a perspective view showing a state in which the display device shown in FIG. 1 is outwardly folded (out-folding) about the first folding axis.

FIG. 2A is a perspective view showing a state in which the display device DD shown in FIG. 1 is inwardly folded (in-folding) about the first folding axis FX1, and FIG. 2B is a perspective view showing a state in which the display device DD shown in FIG. 1 is outwardly folded (out-folding) about the first folding axis FX1.

Referring to FIGS. 1 and 2A, the display device DD may be the foldable display device. The display device DD may be folded about the first folding axis FX1 extending in respective directions (e.g., predetermined directions).

The display device DD may include a plurality of areas defined therein according to its operation mode. The areas may include a folding area FA and at least one non-folding area NFA1 and NFA2. The folding area FA may be defined between the two non-folding areas NFA1 and NFA2.

As an example, the non-folding areas NFA1 and NFA2 may include a first non-folding area NFA1 and a second non-folding area NFA2. The first non-folding area NFA1 is located adjacent to one side of the folding area FA in the first direction DR1, and the second non-folding area NFA2 is located adjacent to the other side of the folding area FA in the first direction DR1.

The display device DD may be inwardly folded (in-folding) or outwardly folded (out-folding). In the present embodiment, "in-folding" indicates a state in which the display surface IS is inwardly folded to allow one portion thereof to face the other portion thereof, and "out-folding" indicates a state in which the rear surface of the display device DD is inwardly folded to allow one portion thereof to face the other portion thereof.

The folding area FA is folded about the first folding axis FX1 to form a curvature. The first folding axis FX1 may extend in the second direction DR2 (e.g., in a major axis direction of the display device DD).

The display device DD shown in FIG. 2A may be inwardly folded (in-folding) to allow the display surface IS of the first non-folding area NFA1 to face the display surface IS of the second non-folding area NFA2.

Referring to FIG. 2B, the display device DD may be outwardly folded (out-folding) about the first folding axis FX1. When the display device DD is outwardly folded, the display surface IS may be exposed to the outside.

Both the in-folding operation and the out-folding operation may occur in one display device DD. However, in the present disclosure, the display device DD may be folded to be only in one of the in-folding and out-folding states.

Figure 3A:
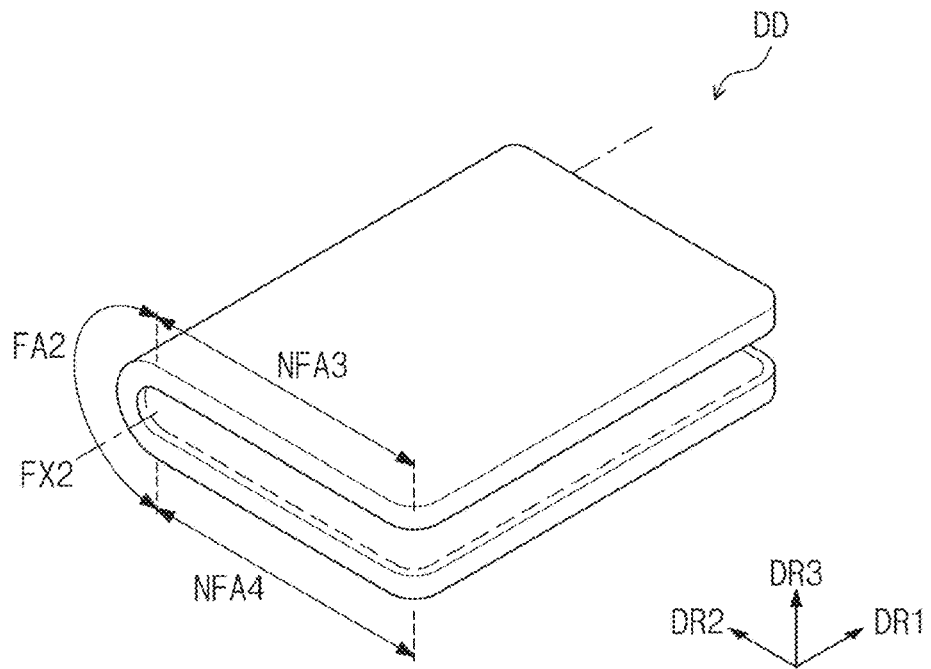
FIG. 3A is a perspective view showing a state in which the display device shown in FIG. 1 is inwardly folded (in-folding) about a second folding axis.
Figure 3B:
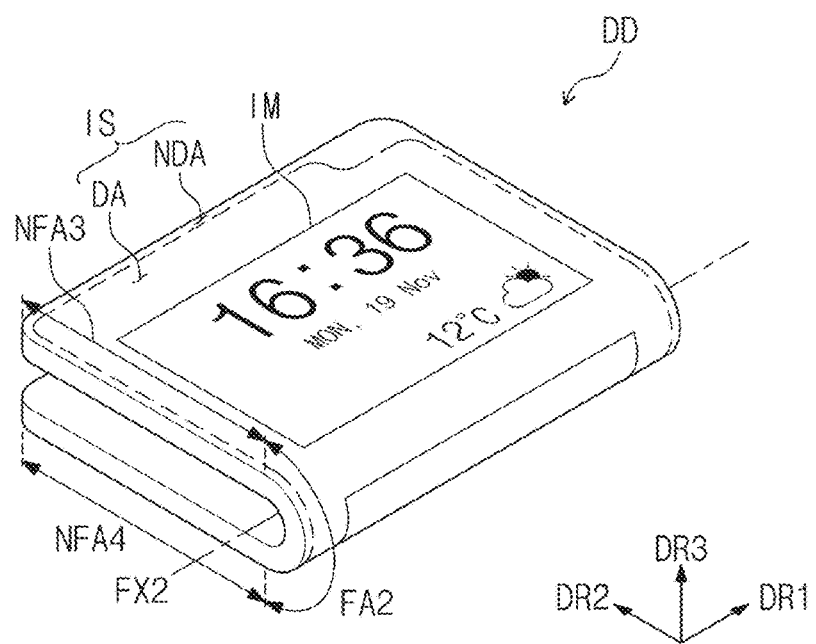
FIG. 3B is a perspective view showing a state in which the display device shown in FIG. 1 is outwardly folded (out-folding) about the second folding axis.

FIG. 3A is a perspective view showing a state in which the display device DD shown in FIG. 1 is inwardly folded (in-folding) about the second folding axis FX2, and FIG. 3B is a perspective view showing a state in which the display device DD shown in FIG. 1 is outwardly folded (out-folding) about the second folding axis FX2.

Referring to FIGS. 3A and 3B, the display device DD may be inwardly or outwardly folded about the second folding axis FX2. The second folding axis FX2 may extend in the first direction DR1 (e.g., in a minor axis direction of the display device DD).

The display device DD may include a plurality of areas defined therein according to its operation mode. The areas may include a folding area FA2 and at least one non-folding area NFA3 and NFA4. The folding area FA2 may be defined between the two non-folding areas NFA3 and NFA4.

As an example, the non-folding areas NFA3 and NFA4 may include a third non-folding area NFA3 and a fourth non-folding area NFA4. The third non-folding area NFA3 is located adjacent to one side of the folding area FA2 in the second direction DR2, and the fourth non-folding area NFA4 is located adjacent to the other side of the folding area FA2 in the second direction DR2.

One display device DD may include the first and second folding axes FX1 and FX2, and may be folded in the major or minor axis. However, in other embodiments the display device DD may include only one folding axis among the first and second folding axes FX1 and FX2.

In the present embodiment, one folding area FA is defined in the display device DD, however, the present disclosure should not be limited thereto or thereby. According to another embodiment of the present disclosure, a plurality of folding areas may be defined in the display device DD.

Figure 4:
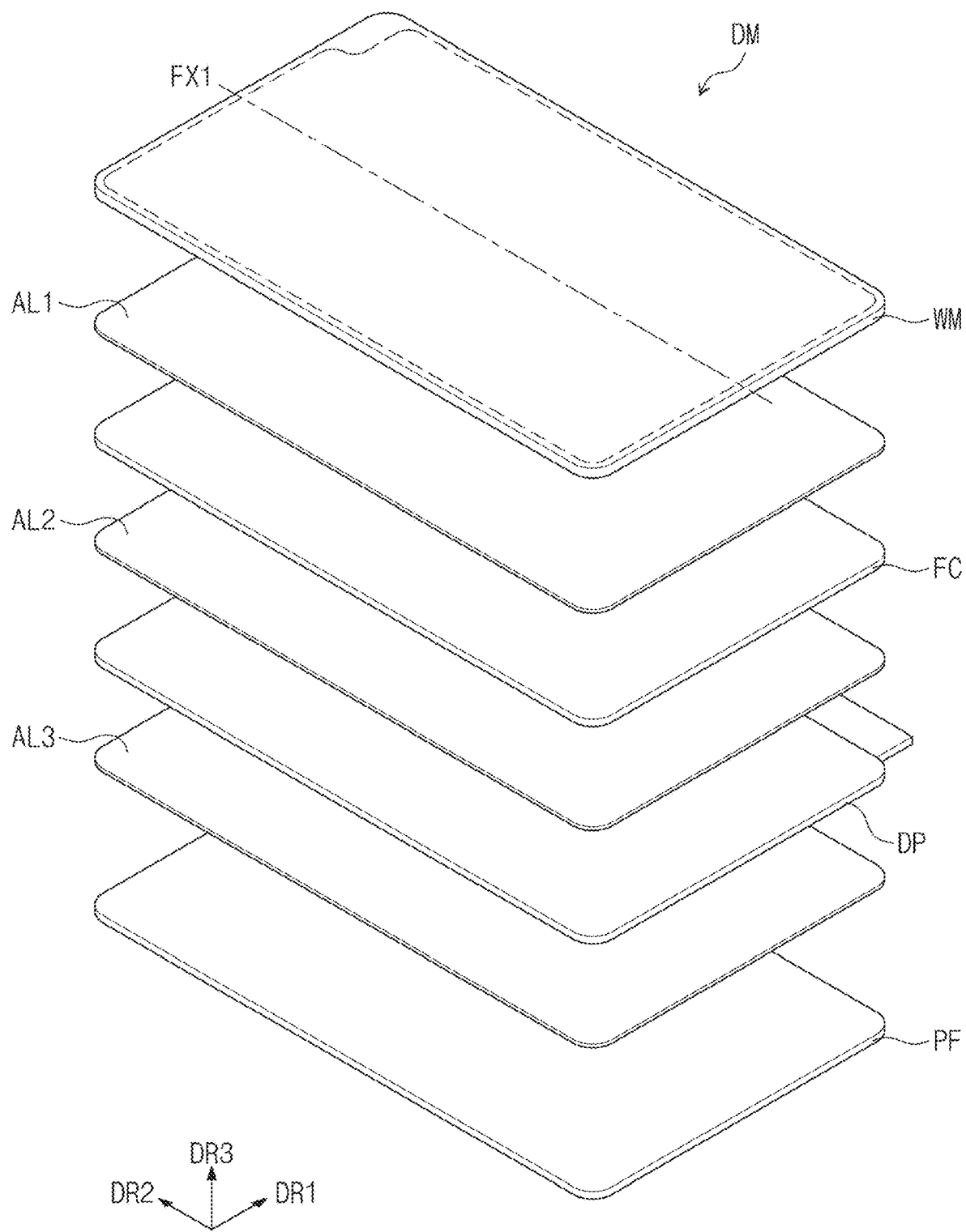
FIG. 4 is an exploded perspective view showing a display module according to an embodiment of the present disclosure.
Figure 5:
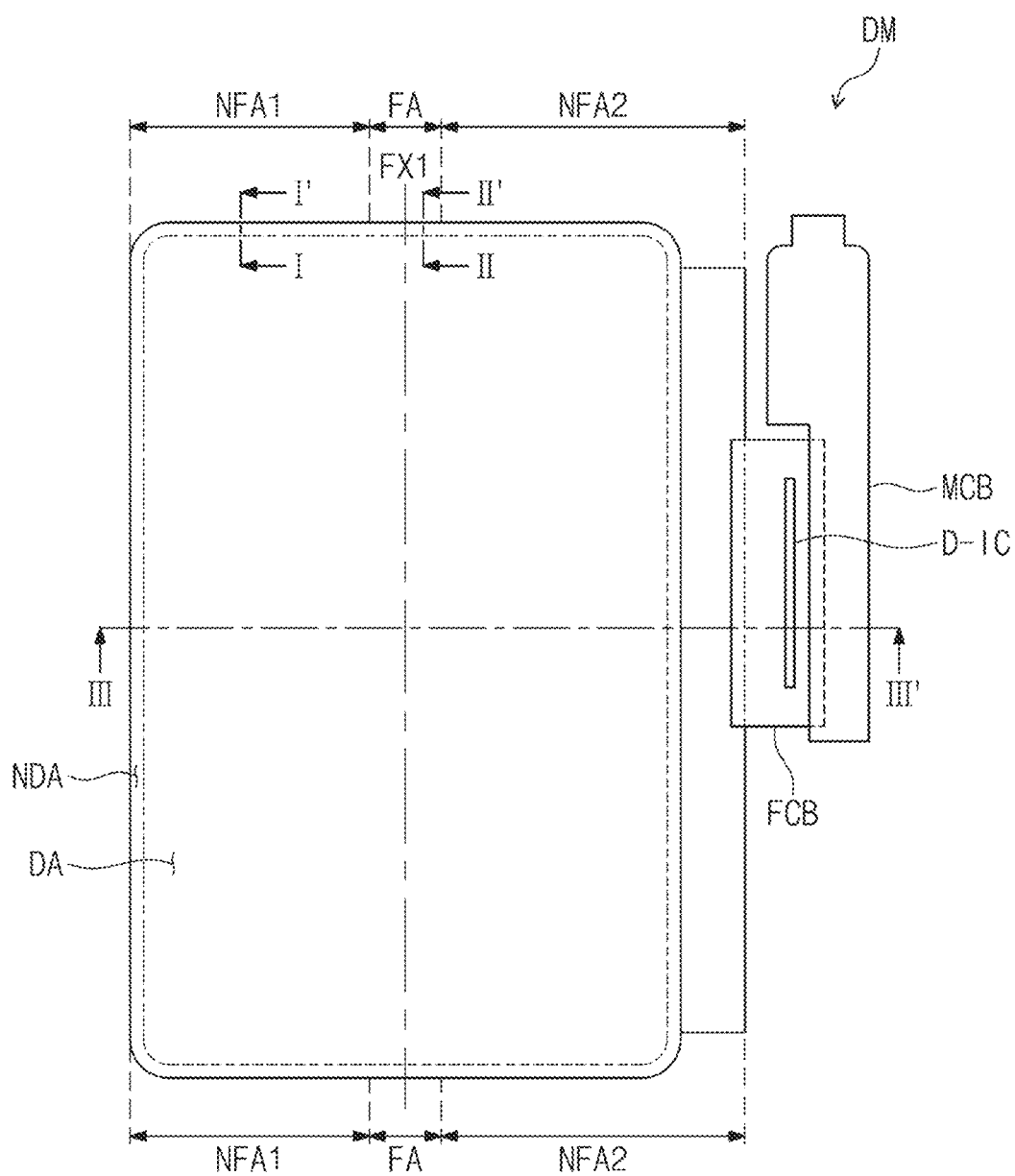
FIG. 5 is a plan view showing the display module shown in FIG. 4.

FIG. 4 is an exploded perspective view showing a display module DM according to an embodiment of the present disclosure, and FIG. 5 is a plan view showing the display module DM shown in FIG. 4.

Referring to FIGS. 4 and 5, the display module DM according to the present embodiment may include a display panel DP and a window WM located on the display panel DP. The display module DM may form a portion of the display device DD (refer to FIG. 1), and for example, the display module DM may provide the display surface IS (refer to FIG. 1) of the display device DD.

The display panel DP may be a flexible display panel. Accordingly, the display panel DP may be folded or unfolded with respect to the first folding axis FX1. As an example, the display panel DP may be, but is not limited to, an organic light emitting display panel.

An upper surface of the window WM defines the display surface IS of the display device DD. The window WM may be optically transparent. Therefore, the user may easily perceive the image generated by the display panel DP through the window WM.

The window WM may include a flexible material. Thus, the window WM may be folded or unfolded about the first folding axis FX1. That is, the shape of the window WM may be deformed when the shape of the display panel DP is deformed.

The window WM transmits the image from the display panel DP, and also serves as a buffer against an external impact to prevent the display panel DP from being damaged or from malfunctioning due to the external impact. The external impact indicates external force represented by pressure or stress, which may otherwise cause defects in the display panel DP. The window WM may prevent defects of the display panel DP by alleviating bending deformation, compression deformation, and/or tensile deformation of the display panel DP due to a point impact and/or a surface impact.

One or more functional layers FC may be located between the display panel DP and the window WM. As an example, the functional layer FC may be an anti-reflective layer that blocks the reflection of external light. The anti-reflective layer may reduce or prevent visibility of components included in the display panel DP (e.g., visibility from the outside due to the external light incident through the front surface of the display device DD). The anti-reflective layer may include a polarizing film and/or a retardation film. The number of retardation films and a retardation length ($\lambda/4$ or $\lambda/2$) of the retardation film may be determined according to an operation principle of the anti-reflection layer.

The functional layer FC may further include an input sensing layer that senses the user input TC (refer to FIG. 1). The input sensing layer is separately formed from the display panel DP, and is coupled to the display panel DP by an adhesive layer. In some embodiments, an input sensing unit may be provided integrally with the display panel DP through at least one successive process. That is, the input sensing unit may be directly located on a thin film encapsulation layer of the display panel DP. Here, the expression "directly located" means that the input sensing unit is located on the display panel DP without using a separate adhesive member.

The window WM and the functional layer FC may be attached to each other by a first adhesive layer AL1. The display panel DP and the functional layer FC may be attached to each other by a second adhesive layer AL2.

The first and second adhesive layers AL1 and AL2 may be optically transparent. The first and second adhesive layers AL1 and AL2 each may be an adhesive layer manufactured by coating a liquid adhesive material and by curing the liquid adhesive material, or may be an adhesive sheet separately manufactured. For example, the first and second adhesive layers AL1 and AL2 each may be a pressure sensitive adhesive (PSA), an optically clear adhesive (OCA), or an optically clear resin (OCR).

A protective film PF may be located on a rear surface of the display panel DP. The protective film PF may include a polymer material. The protective film PF absorbs the impacts applied thereto from the outside, thereby protecting the display panel DP from the impacts. The protective film PF may be attached to the rear surface of the display panel DP by a third adhesive layer AL3.

FIG. 4 shows the protective film PF located on the rear surface of the display panel DP. However, the present disclosure should not be limited thereto or thereby. For example, the display module DM may further include an upper protective film located between the display panel DP and the functional layer FC.

A material used to form the protective film PF should not be limited to plastic resins, and may include organic/inorganic composite materials. The protective film PF may include a porous organic layer, and an inorganic material filled in the pores of the organic layer.

Referring to FIG. 5, the display module DM may further include a flexible printed circuit board FCB connected to the display panel DP, and a driving chip D-IC mounted on the flexible printed circuit board FCB. The flexible printed circuit board FCB may be connected to a main circuit board MCB. Components, such as a control chip, a plurality of passive elements, and a plurality of active elements, may be mounted on the main circuit board MCB. The main circuit board MCB may be a flexible film like the flexible printed circuit board FCB.

In the present embodiment, a chip-on-film (COF) structure in which the driving chip D-IC is mounted on the flexible printed circuit board FCB is shown. In the COF structure, the display module DM may include two circuit boards FCB and MCB. However, the present disclosure should not be limited thereto or thereby. For example, the display module may have a chip-on-panel (COP) structure in which the driving chip D-IC is mounted on the display panel DP.

Figure 6A:
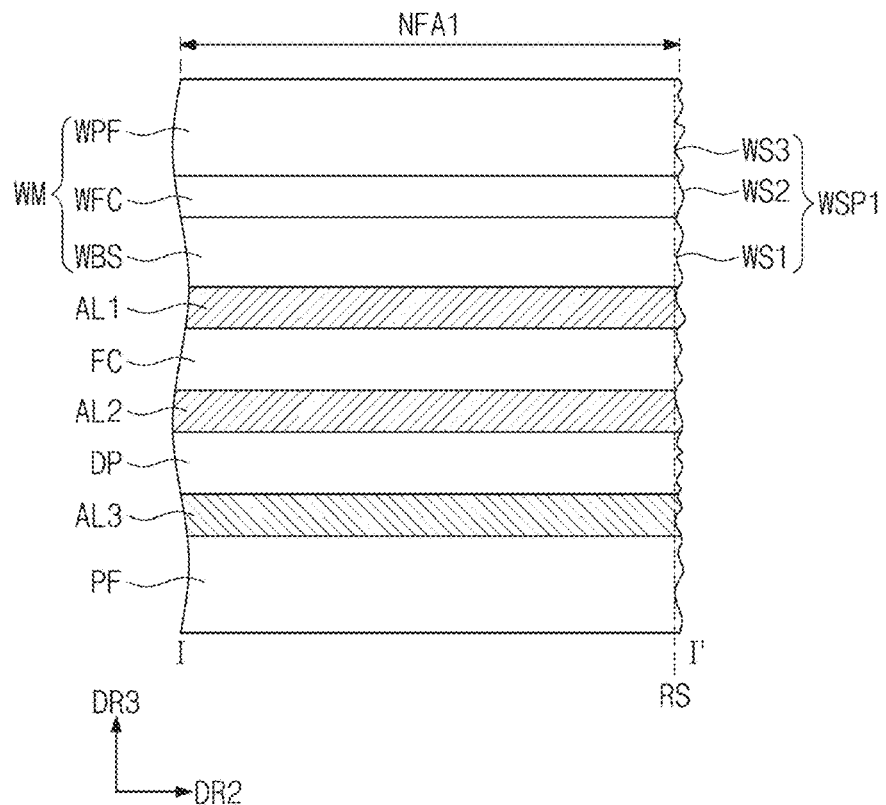
FIG. 6A is a cross-sectional view taken along the line I-I' shown in FIG. 5 to show a non-folding area.
Figure 6B:
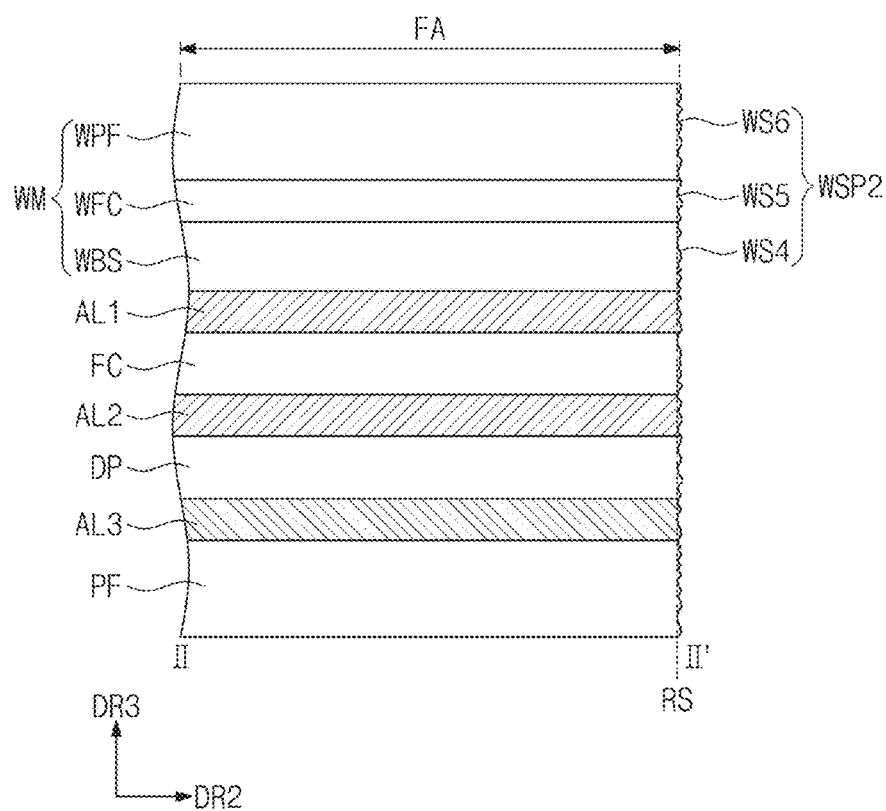
FIG. 6B is a cross-sectional view taken along the line II-II' shown in FIG. 5 to show a folding area.

FIG. 6A is a cross-sectional view taken along the line I-I' shown in FIG. 5 to show the non-folding area, and FIG. 6B is a cross-sectional view taken along the line II-II' shown in FIG. 5 to show the folding area.

Referring to FIGS. 6A and 6B, the window WM may include a base layer WBS, a window functional layer WFC, and a window protective layer WPF. The base layer WBS, the window functional layer WFC, and the window protective layer WPF may be sequentially stacked in the third direction DR3 (refer to FIG. 1).

The base layer WBS may include a transparent insulating material. The base layer WBS may have flexibility, although the present disclosure should not be limited thereto or thereby. That is, the base layer WBS may include a material that is able to be bent by adjusting its thickness even though the material is generally rigid.

As an example, the base layer WBS may include at least one of polyimide (PI), polyamide-imide (PAI), polyetheretherketone (PEEK), polyetherimide (PEI), and a thin film glass. However, this is merely an example, and the material for the base layer WBS should not be limited thereto or thereby.

The window functional layer WFC may be located on the base layer WBS. For example, the window functional layer WFC may include at least one of an anti-fingerprint layer, an anti-reflective layer, an anti-glare layer, and a hard coating layer. The window functional layer WFC may be located on an upper surface of the base layer WBS (e.g., a surface facing the user). The hard coating layer of the window functional layer WFC protects the base layer WBS from external impacts. The hard coating layer may have a higher indentation hardness than the base layer WBS. Accordingly, the hard coating layer may include at least one of a urethane-based resin, an epoxy-based resin, an acrylic-based resin, and an acrylate-based resin.

The window protective layer WPF is located on the window functional layer WFC. The window protective layer WPF improves impact resistance of the window WM, and prevents shattering of the window WM when the window WM is damaged. Particularly, when the window functional layer WFC includes the hard coating layer, the window protective layer WPF absorbs the external impacts to protect the hard coating layer from the external impacts, and thus the impact resistance of the hard coating layer may be improved.

The window protective layer WPF may include at least one selected from a urethane-based resin, an epoxy-based resin, a polyester-based resin, a polyether-based resin, an acrylate-based resin, an acrylonitrile-butadiene-styrene (ABS) resin, and a rubber. As an example, the window protective layer WPF may include at least one of phenylene, polyethyleneterephthalate (PET), polyimide (PI), polyamide (PAI), polyethylene naphthalate (PEN), and polycarbonate (PC).

An adhesive layer may be further located between the window protective layer WPF and the window functional layer WFC.

A first side surface portion WSP1 of the window WM is disposed in the first and second non-folding areas NFA1 and NFA2 and has a first surface roughness in the first and second non-folding areas NFA1 and NFA2. A second side surface portion WSP2 of the window WM is disposed in the folding area FA and has a second surface roughness in the folding area FA. The second surface roughness is smaller than/less than (e.g., less rough) the first surface roughness. The first surface roughness is defined by an average value of heights or distances from a reference surface RS that is parallel to the third direction DR3 to the first side surface portion WSP1 of the window WM in the first and second non-folding areas NFA1 and NFA2. The second surface roughness is defined by an average value of heights or distances from the reference surface RS to the second side surface portion WSP2 of the window WM in the folding area FA.

Each of the first and second side surface portions WSP1 and WSP2 of the window WM may include a side surface WS1 and WS4 of the base layer WBS, a side surface WS2 and WS5 of the window functional layer WFC, and a side surface WS3 and WS6 of the window protective layer WPF. In the case where the adhesive layer is located between the window functional layer WFC and the window protective layer WPF, each of the first and second side surface portions WSP1 and WSP2 of the window WM may further include a side surface of the adhesive layer.

In this case, the first surface roughness of the first side surface portion WSP1 of the window WM may be defined as a value obtained by averaging heights of the side surface WS1 of the base layer WBS, the side surface WS2 of the window functional layer WFC, and the side surface WS3 of the window protective layer WPF with respect to the reference surface RS in the first and second non-folding areas NFA1 and NFA2. The second surface roughness of the second side surface portion WSP2 of the window WM may be defined as a value obtained by averaging heights of the side surface WS4 of the base layer WBS, the side surface WS5 of the window functional layer WFC, and the side surface WS6 of the window protective layer WPF with respect to the reference surface RS in the folding area FA.

According to the present embodiment, the first side surface portion WSP1 of the window WM may have a relatively greater surface roughness than that of the second side surface portion WSP2 of the window WM. A surface modification may occur on the first and second side surface portions WSP1 and WSP2 of the window WM due to a laser process performed along a cutting line to complete the display module DM. In this case, the fact that the second surface roughness of the second side surface portion WSP2 of the window WM is less than the first surface roughness of the first side surface portion WSP1 of the window WM may mean that the surface modification of the second side surface portion WSP2 of the window WM occurs less than that of the first side surface portion WSP1 of the window WM.

The fact that the second surface roughness of the second side surface portion WSP2 of the window WM is relatively small, and that the surface modification occurs less in the folding area FA, may mean that stress applied to, and damage of, the second side surface portion WSP2 of the window WM in the folding area FA are small during the laser process. As described above, because the stress and the damage applied to the folding area FA are reduced or minimized in the manufacturing process, defects, such as crack, may be reduced or prevented from occurring in the folding area FA despite repeated folding operations of the completed display device DD.

Figure 7A:
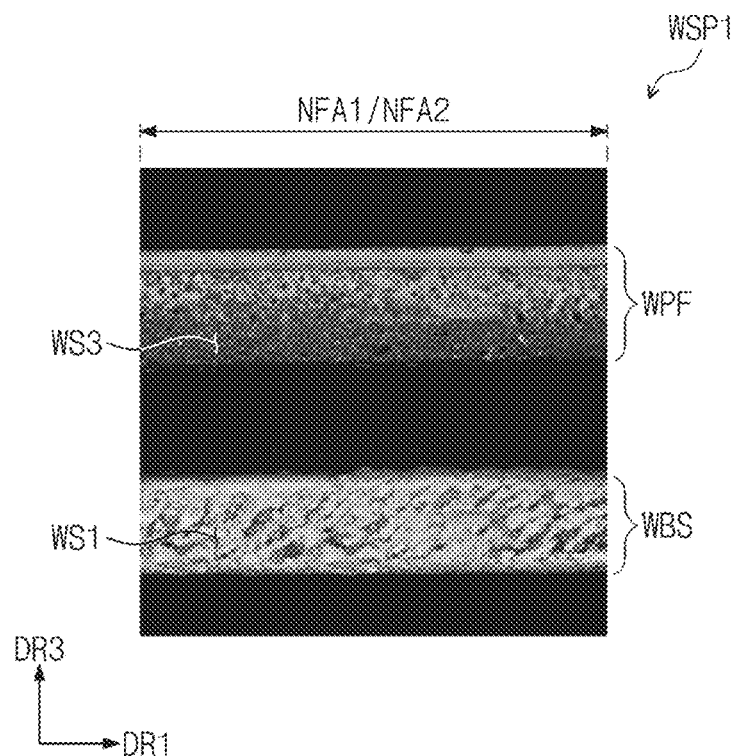
FIG. 7A is a scanning electron microscope (SEM) image obtained by photographing a side surface of a window located in the non-folding area of FIG. 6A.
Figure 7B:
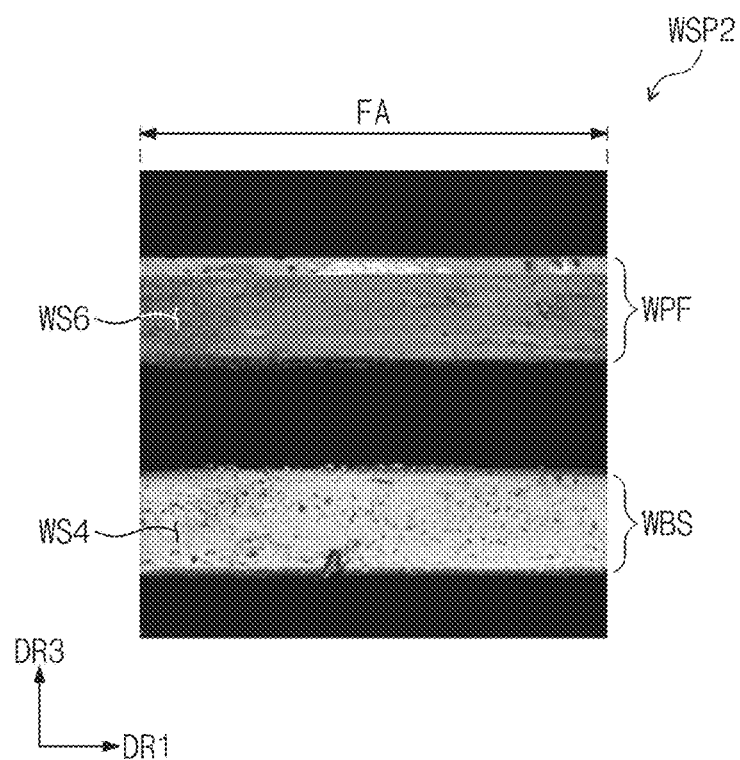
FIG. 7B is a SEM image obtained by photographing a side surface of a window located in the folding area of FIG. 6B.

FIG. 7A is a scanning electron microscope (SEM) image obtained by photographing the side surface of the window located in the non-folding area of FIG. 6A, and FIG. 7B is a SEM image obtained by photographing the side surface of the window located in the folding area of FIG. 6B.

Referring to FIGS. 7A and 7B, the first side surface portion WSP1 of the window WM in the non-folding areas NFA1 and NFA2 has the surface roughness that is greater than that of the second side surface portion WSP2 of the window WM in the folding area FA. That is, while relatively large and irregular concave and convex portions are formed on the first side surface portion WSP1 of the window WM located in the non-folding areas NFA1 and NFA2, relatively small and irregular concave and convex portions are formed on the second side surface portion WSP2 of the window WM located in the folding areas FA.

As shown in FIG. 7A, large and small black dots are visually observed on the side surface WS3 of the window protective layer WPF located in the non-folding areas NFA1 and NFA2. In this case, the black dots may be portions concavely recessed from the side surface WS3 of the window protective layer WPF. Portions that are relatively bright around the black dots may be portions convexly protruded.

That is, when observing the side surface WS3 of the window protective layer WPF located in the non-folding areas NFA1 and NFA2 as a whole, the number and size of the black dots are large, and there is a significant difference in contrast depending on position.

Referring to FIG. 7B, there is no significant difference in contrast depending on position on the side surface WS6 of the window protective layer WPF located in the folding area FA, and the black dots are barely noticeable. Accordingly, it is found that the side surface WS3 of the window protective layer WPF located in the non-folding areas NFA1 and NFA2 has higher surface roughness than that of the side surface WS6 of the window protective layer WPF located in the folding area FA. In other words, the side surface WS6 of the window protective layer WPF in the folding area FA is smoother than the side surface WS3 of the window protective layer WPF in the non-folding areas NFA1 and NFA2.

In addition, a size of areas represented by a dark color on the side surface WS1 of the base layer WBS located in the non-folding areas NFA1 and NFA2 is larger than that on the window protection layer WPF. That is, concave and convex portions, which are larger than those of the window protective layer WPF, are formed on the side surface WS1 of the base layer WBS in the non-folding areas NFA1 and NFA2. The side surface WS1 of the base layer WBS in the non-folding areas NFA1 and NFA2 may have surface roughness that is larger than that of the side surface WS3 of the window protective layer WPF in the non-folding areas NFA1 and NFA2.

Referring to FIG. 7B, fine black dots are observed on the side surface WS4 of the base layer WBS located in the folding area FA. That is, concave and convex portions, which are smaller than those on the side surface WS1 of the base layer WBS located in the non-folding areas NFA1 and NFA2, are formed on the side surface WS4 of the base layer WBS in the folding area FA. The side surface WS4 of the base layer WBS located in the folding area FA may have surface roughness that is less than that of the side surface WS1 of the base layer WBS located in the non-folding areas NFA1 and NFA2.

Consequently, while a relatively large surface deformation in the first direction DR1 occurs in the side surface of each layer of the window WM in the non-folding areas NFA1 and NFA2, a relatively small surface deformation in the first direction DR1 occurs in the folding area FA. That is, the stress and damage applied to the second side surface portion WSP2 of the window WM located in the folding area FA during the manufacturing process of the display module DM may be less than the stress and damage applied to the first side surface portion WSP1 of the window WM located in the non-folding areas NFA1 and NFA2 during the manufacturing process of the display module DM (refer to FIG. 4).

Figure 8A:
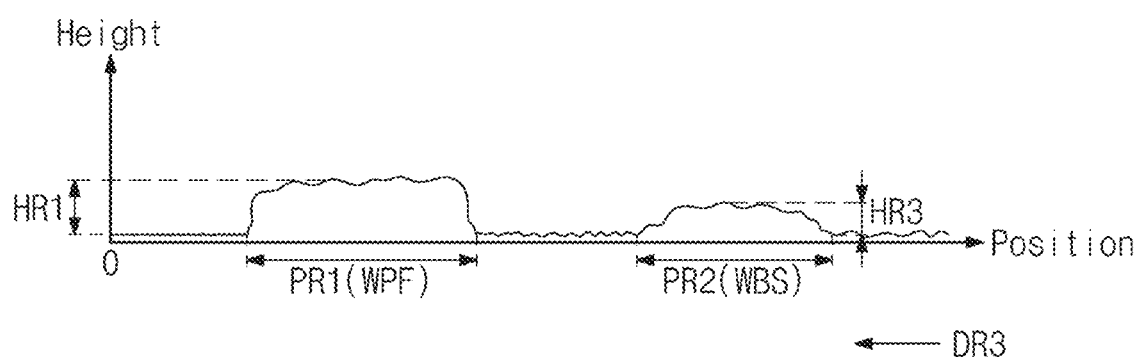
FIG. 8A is a graph showing a variation in height with respect to a reference surface of each layer of the window in the non-folding area.
Figure 8B:
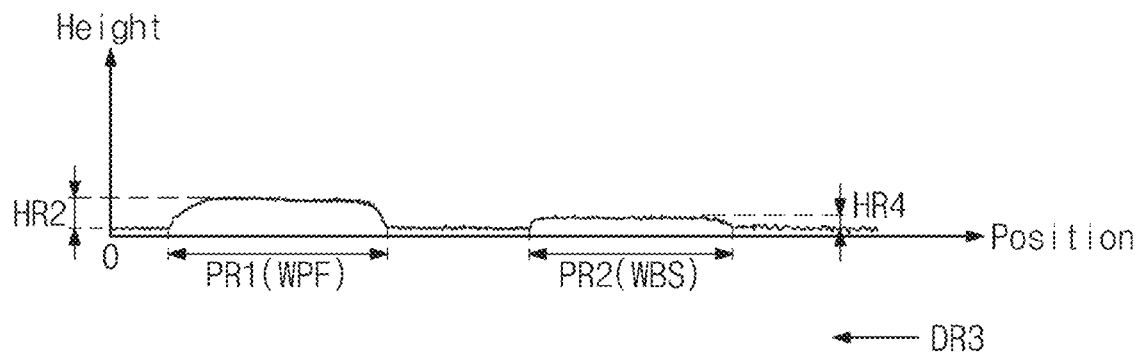
FIG. 8B is a graph showing a variation in height with respect to a reference surface of each layer of the window in the folding area.

FIG. 8A is a graph showing a variation in height with respect to a reference surface of each layer of the window in the non-folding area, and FIG. 8B is a graph showing a variation in height with respect to a reference surface of each layer of the window in the folding area. In FIGS. 8A and 8B, a horizontal axis represents a position, and a vertical axis represents the height with respect to the reference surface.

Referring to FIGS. 6A, 6B, 8A, and 8B, when a height of the reference surface RS is zero (0), the side surface of each layer of the window WM may be located at different heights/distances from the reference surface RS depending on the position. In FIGS. 8A and 8B, a first position range PR1 may be defined as an area in which the window protective layer WPF is located, and a second position range PR2 may be defined as an area in which the base layer WBS is located.

The side surface WS3 of the window protective layer WPF may be located at a first height range HR1 from the reference surface RS in the non-folding areas NFA1 and NFA2. The side surface WS6 of the window protective layer WPF may be located at a second height range HR2 from the reference surface RS in the folding area FA. The second height range HR2 may have a width that is less than a width of the first height range HR1. That is, a variation in height of the side surface WS6 of the window protective layer WPF is smaller in the folding area FA than in the non-folding areas NFA1 and NFA2.

The side surface WS1 of the base layer WBS may be located at a third height range HR3 from the reference surface RS in the non-folding areas NFA1 and NFA2. The side surface WS4 of the base layer WBS may be located at a fourth height range HR4 from the reference surface RS in the folding area FA. The fourth height range HR4 may have a width that is less than a width of the third height range HR3. That is, a variation in height of the side surface WS4 of the base layer WBS is smaller in the folding area FA than in the non-folding areas NFA1 and NFA2.

In addition, when the surface roughness in the third direction DR3 of the first and second side surface portions WSP1 and WSP2 of the window WM is represented by a root-mean-square (Rq), the surface roughness Rq of the first side surface portion WSP1 of the window WM may be about 293 μm in the non-folding areas NFA1 and NFA2, and the surface roughness Rq of the second side surface portion WSP2 of the window WM may be about 208 μm in the folding area FA.

That is, while a relatively large surface deformation in the third direction DR3 occurs in the first side surface portion WSP1 of the window WM, a relatively small surface deformation in the third direction DR3 occurs in the second side surface portion WSP2 of the window WM. In other words, the stress and the damage applied to the second side surface portion WSP2 of the window WM located in the folding area FA in the manufacturing process of the display module DM may be less than the stress and the damage applied to the first side surface portion WSP1 of the window WM located in the non-folding areas NFA1 and NFA2 in the manufacturing process of the display module DM (refer to FIG. 4).

Figure 9A:
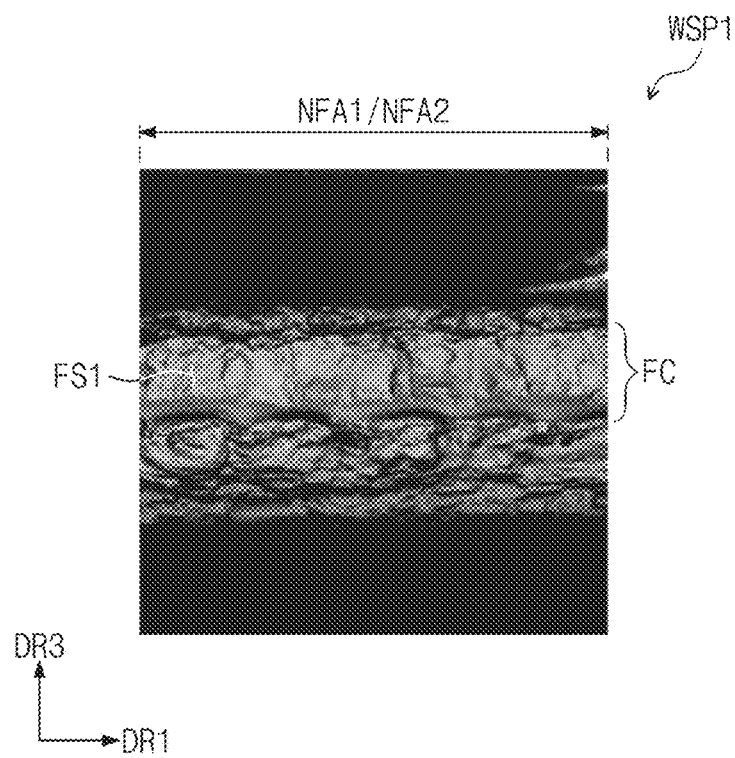
FIG. 9A is a SEM image obtained by photographing a side surface of a functional layer located in the non-folding area shown in FIG. 6A.
Figure 9B:
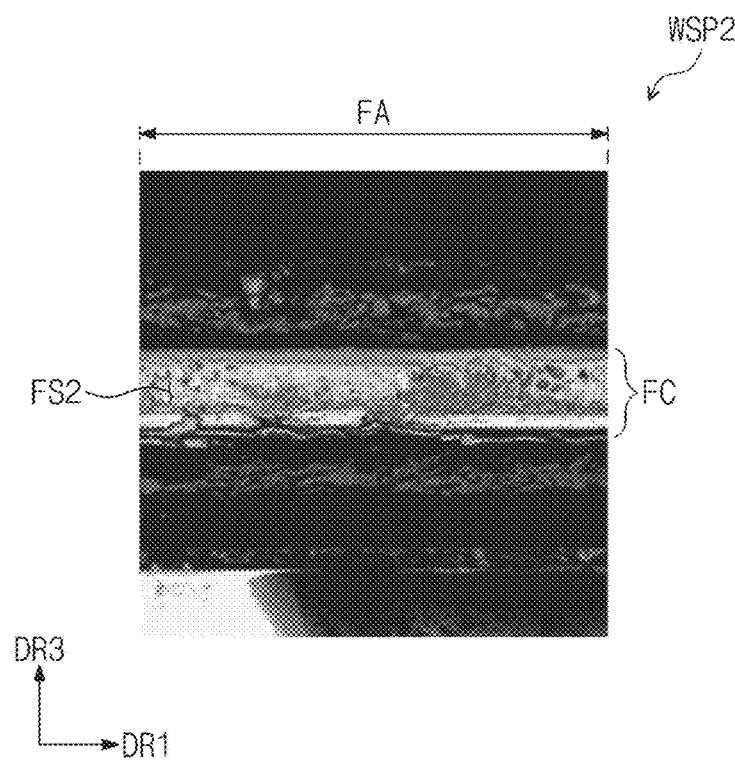
FIG. 9B is a SEM image obtained by photographing a side surface of a functional layer located in the folding area shown in FIG. 6B.

FIG. 9A is a SEM image obtained by photographing the side surface of the functional layer located in the non-folding area shown in FIG. 6A, and FIG. 9B is a SEM image obtained by photographing the side surface of the functional layer located in the folding area shown in FIG. 6B.

Referring to FIGS. 9A and 9B, a first side surface FS1 of the functional layer FC located in the non-folding areas NFA1 and NFA2 has a surface roughness that is larger than a surface roughness of a second side surface FS2 of the functional layer FC located in the folding area FA. That is, while relatively large wavy concave and convex portions are formed on the first side surface FS1 of the functional layer FC located in the non-folding areas NFA1 and NFA2, relatively small wavy and irregular concave and convex portions are formed on the second side surface FS2 of the functional layer FC located in the folding area FA.

That is, the first side surface FS1 of the functional layer FC located in the non-folding areas NFA1 and NFA2 has surface roughness that is larger than that of the second side surface FS2 of the functional layer FC located in the folding area FA.

Consequently, while a relatively large surface deformation in the first direction DR1 occurs in the first side surface FS1 of the functional layer FC, a relatively small surface deformation in the first direction DR1 occurs in the second side surface FS2 of the functional layer FC. That is, the stress and the damage applied during the manufacturing process of the display module DM to the second side surface FS2 of the functional layer FC located in the folding area FA may be less than the stress and the damage applied during the manufacturing process of the display module DM to the first side surface FS1 of the functional layer FC located in the non-folding areas NFA1 and NFA2 (refer to FIG. 4).

Figure 10:
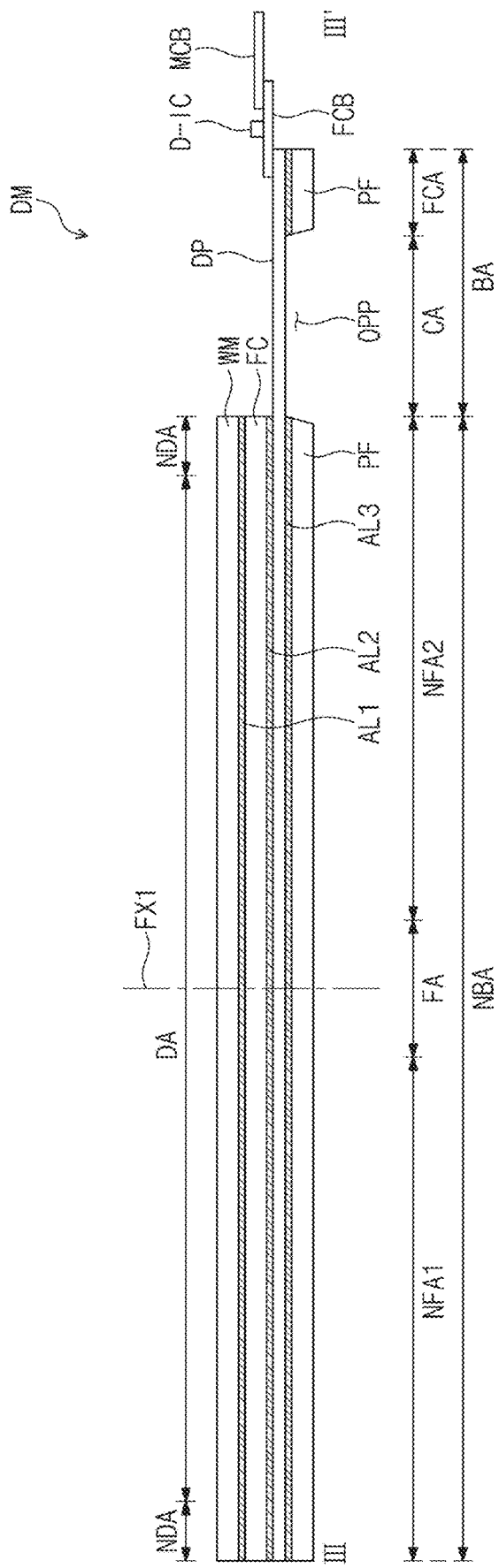
FIG. 10 is a cross-sectional view taken along the line III-III' shown in FIG. 5.

FIG. 10 is a cross-sectional view taken along the line III-III' shown in FIG. 5.

Referring to FIGS. 5 and 10, the display module DM may include the flexible display panel DP. The display panel DP may include a bending area (e.g., a circuit board bending area) BA and a non-bending area NBA. The non-bending area NBA may include the display area DA and the non-display area NDA of the display module DM. The bending area BA may correspond to a portion of the display panel DP, and may be bent. The folding area FA and the first and second non-folding areas NFA1 and NFA2 of the display module DM may be included in the non-bending area NBA.

The bending area BA may include a curvature area CA, wherein the display panel DP may have a curvature (e.g., a predetermined curvature) in a bent state, and a facing area FCA facing the non-bending area NBA in the bent state. The curvature area CA is defined as being adjacent to the non-bending area NBA and is substantially bent. The facing area FCA is defined as being adjacent to the curvature area CA and does not form the curvature (e.g., is substantially unbent). The facing area FCA faces the non-bending area NBA, and is spaced apart from the non-bending area NBA. The flexible printed circuit board FCB is connected to the facing area FCA of the display panel DP.

The protective film PF is located to correspond to the non-bending area NBA and the facing area FCA, and is not located in the curvature area CA. A bending opening OPP may be defined by the protective film PF to correspond to the curvature area CA. As the protective film PF is removed from the curvature area CA, the stress occurring in the curvature area CA during a bending process of the display panel DP may be reduced. When the bending opening OPP is defined in the protective film PF, as an example, the third adhesive layer AL3 corresponding to the bending opening OPP may be removed.

According to another embodiment, the protective film PF may include a groove defined therein or thereby in a region corresponding to the curvature area CA. That is, instead of being omitted entirely, the protective film PF may be formed to be thinner in the curvature area CA than in the other areas NBA and FCA.

Figure 11:
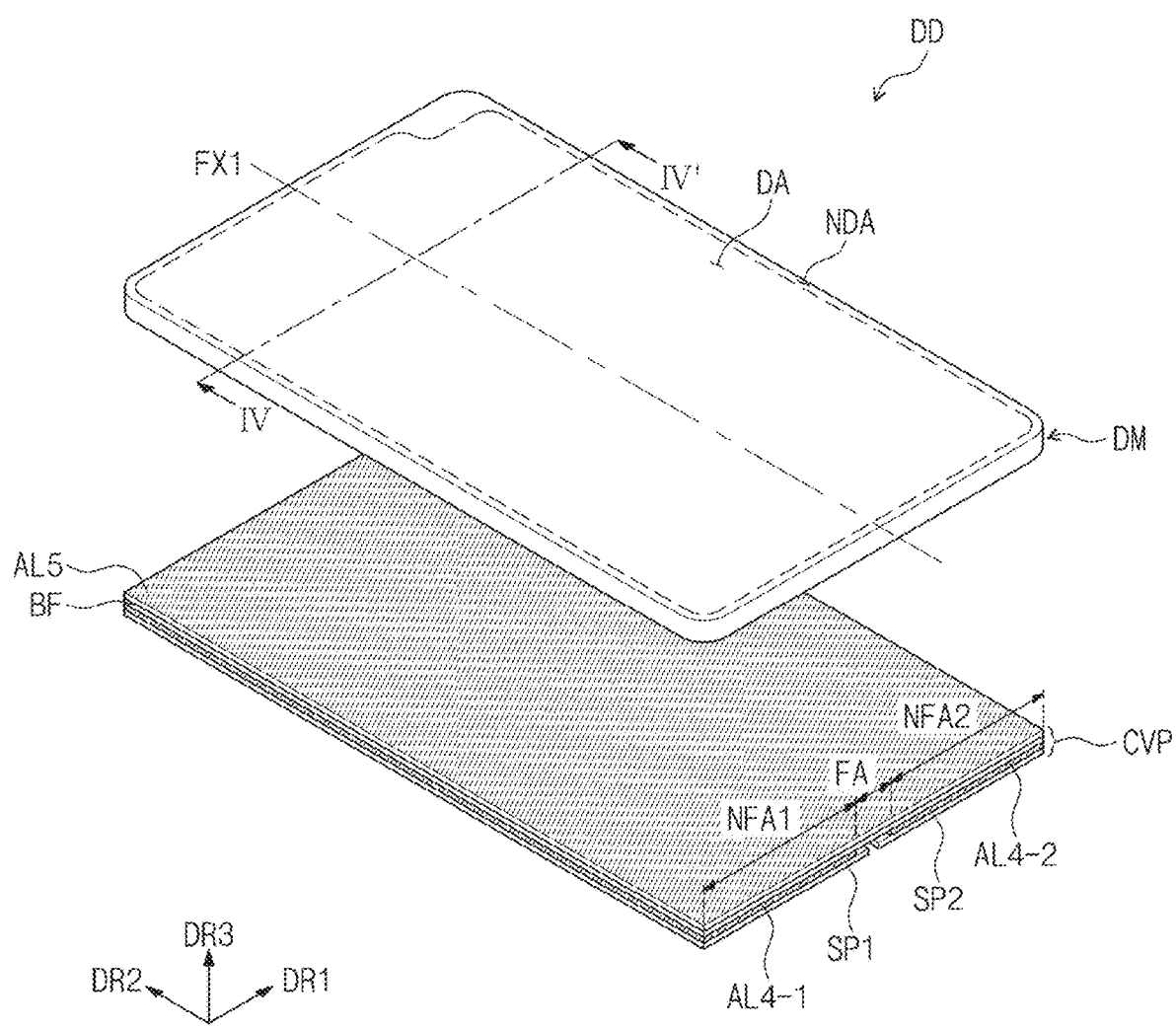
FIG. 11 is an exploded perspective view showing a display device according to an embodiment of the present disclosure.
Figure 12:
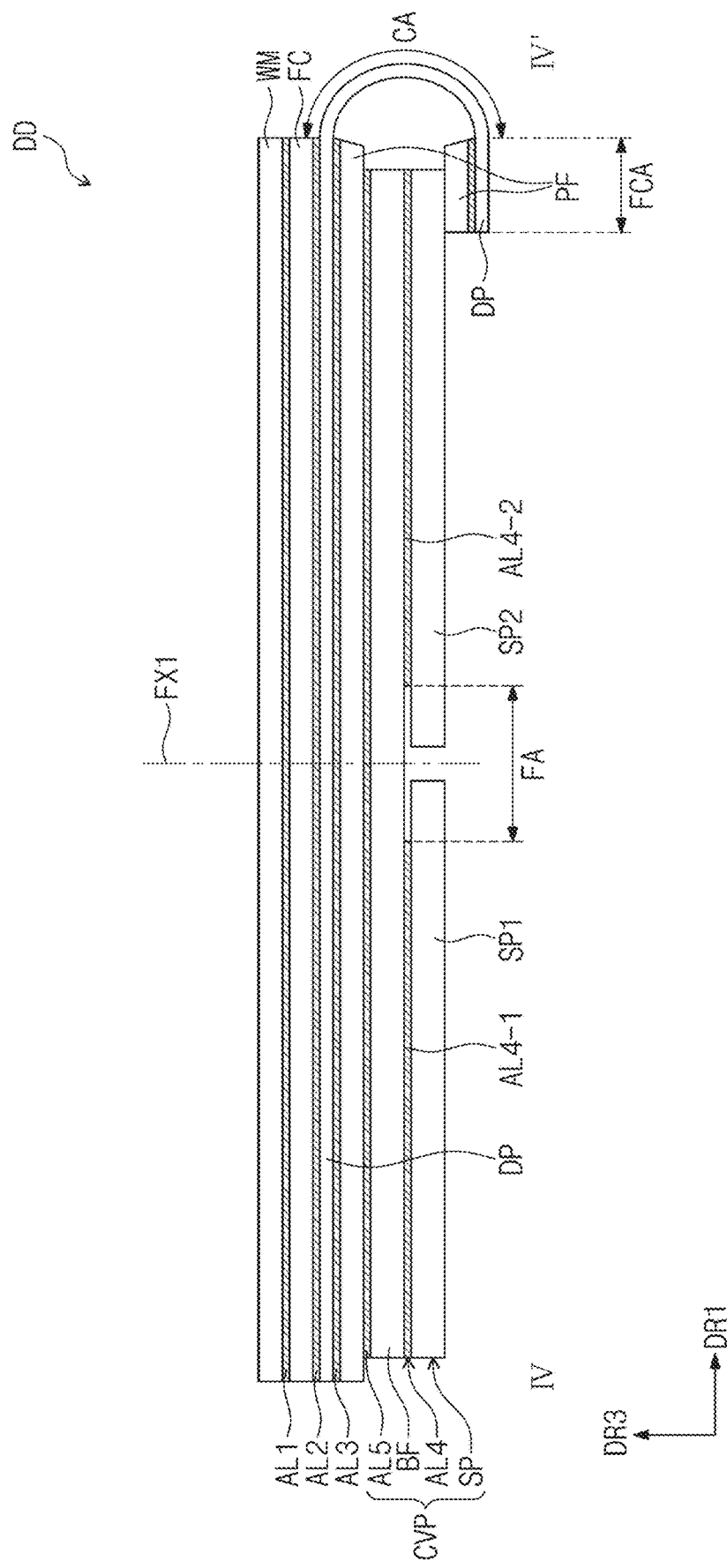
FIG. 12 is a cross-sectional view taken along the line IV-IV' shown in FIG. 11.

FIG. 11 is an exploded perspective view showing a display device DD according to an embodiment of the present disclosure, and FIG. 12 is a cross-sectional view taken along the line IV-IV' shown in FIG. 11.

Referring to FIGS. 11 and 12, the display device DD includes a display module DM and a cover panel CVP. The display module DM includes a display panel DP for displaying an image, and a window WM located on the display panel DP. The display module DM has substantially the same structure as the display module DM shown in FIGS. 4 and 5, and thus details thereof will be omitted.

The cover panel CVP is located under the display module DM. The cover panel CVP is coupled to a rear surface of the display module DM. The cover panel CVP supports the rear surface of the display module DM. The cover panel CVP has a structure in which layers are stacked in the third direction DR3.

As an example, the cover panel CVP may include a support plate and a fourth adhesive layer. The support plate may be located on the rear surface of the display module DM. The support plate may be a metal plate. The support plate may be a stainless steel plate. The support plate may have a strength that is greater than a strength of the display module DM.

The support plate may include a first support plate SP1 that supports a first non-folding area NFA1 of the display module DM and a second support plate SP2 that supports a second non-folding area NFA2. The first and second support plates SP1 and SP2 may have a plate shape.

The first support plate SP1 and the second support plate SP2 may be spaced apart from each other in the first direction DR1. The first support plate SP1 and the second support plate SP2 may be spaced apart from each other at a folding area FA. The first support plate SP1 may overlap with a portion of the folding area FA, and the second support plate SP2 may overlap with a portion of the folding area FA. That is, a distance between the first and second support plates SP1 and SP2 in the first direction DR1 may be less than a width of the folding area FA.

The fourth adhesive layer includes a first sub-adhesive layer AL4-1 and a second sub-adhesive layer AL4-2. The first sub-adhesive layer AL4-1 overlaps with the first non-folding area NFA1, and the second sub-adhesive layer AL4-2 overlaps with the second non-folding area NFA2. The first and second sub-adhesive layers AL4-1 and AL4-2 are located to be spaced apart from each other in the first direction DR1. The first and second sub-adhesive layers AL4-1 and AL4-2 are located to be spaced apart from each other in the folding area FA. The first sub-adhesive layer AL4-1 is located between the first support plate SP1 and the display module DM, and the second sub-adhesive layer AL4-2 is located between the second support plate SP2 and the display module DM.

The cover panel CVP further includes a buffer film BF and a fifth adhesive layer AL5. The buffer film BF is located between the fourth adhesive layer and the display module DM. The buffer film BF may include a polymer material. The buffer film BF may be a layer that absorbs external impacts applied thereto from the outside.

FIGS. 11 and 12 show a structure in which the buffer film BF includes one layer, however, the present disclosure should not be limited thereto or thereby. The buffer film BF may include a plurality of layers, and positions thereof should not be limited thereto or thereby.

The support plate may be fixed to the buffer film BF by the fourth adhesive layer. The support plate may be attached to a rear surface of the buffer film BF by the fourth adhesive layer. The buffer film BF may be formed over the entirety of the folding area FA and the first and second non-folding areas NFA1 and NFA2. The first support plate SP1 may be attached to the rear surface of the buffer film BF by the first sub-adhesive layer AL4-1, and the second support plate SP2 may be attached to the rear surface of the buffer film BF by the second sub-adhesive layer AL4-2.

The fifth adhesive layer AL5 is located between the buffer film BF and the display module DM to attach the buffer film BF to the rear surface of the display module DM.

The fourth adhesive layer and the fifth adhesive layer AL5 may be optically transparent. The fourth adhesive layer and the fifth adhesive layer AL5 may be an adhesive layer that is manufactured by coating a liquid adhesive material and curing the liquid adhesive material, or may be an adhesive sheet that is separately manufactured. For example, the fourth adhesive layer and the fifth adhesive layer AL5 may be a pressure sensitive adhesive (PSA), an optically clear adhesive (OCA), or an optically clear resin (OCR).

FIGS. 10, 11, and 12 show the support plate including two support plates SP1 and SP2 as a representative example. However, the number of the support plates should not be limited to two. When the number of the folding axes FX1 increases, the support plate may include a plurality of support plates separated from each other with respect to the first folding axis FX1. The first and second support plates SP1 and SP2 may be located to correspond to a non-bending area NBA.

When a curvature area CA of the display module DM is bent, a facing area FCA faces the non-bending area NBA, and a flexible printed circuit board FCB and a main circuit board MCB, which are connected to the facing area FCA, are located to be parallel to the non-bending area NBA of the display panel DP. The first and second support plates SP1 and SP2 may be located to overlap with the non-bending area NBA. In addition, after the display module DM is bent, the flexible printed circuit board FCB and the main circuit board MCB may be placed on a rear surface of the second support plate SP2.

The display device DD may further include an adhesive layer to attach the flexible printed circuit board FCB and the main circuit board MCB to the second support plate SP2. Accordingly, the flexible printed circuit board FCB and the main circuit board MCB may be fixed to the rear surface of the second support plate SP2.

Figure 13A:
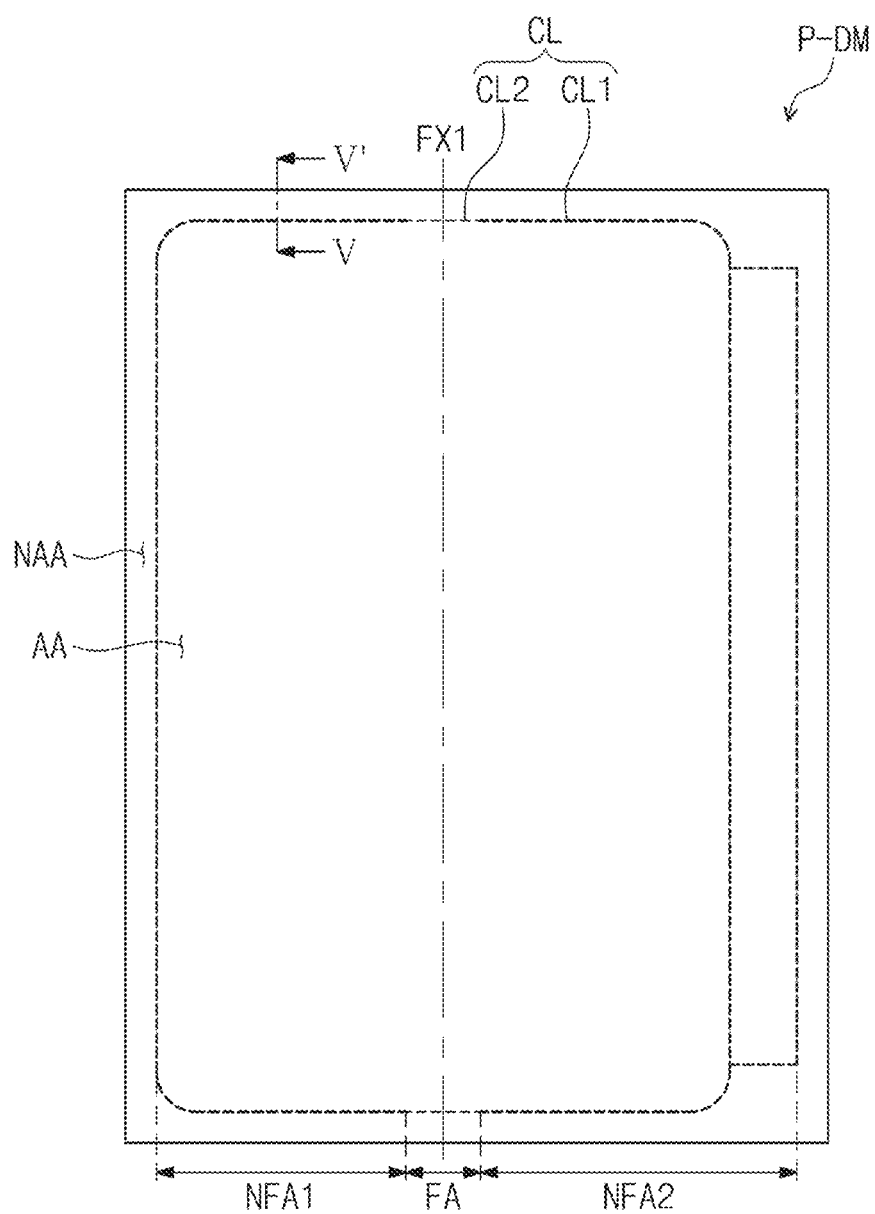
FIGS. 13A to 13C are plan views showing a method of manufacturing a display panel according to an embodiment of the present disclosure.
Figure 13B:
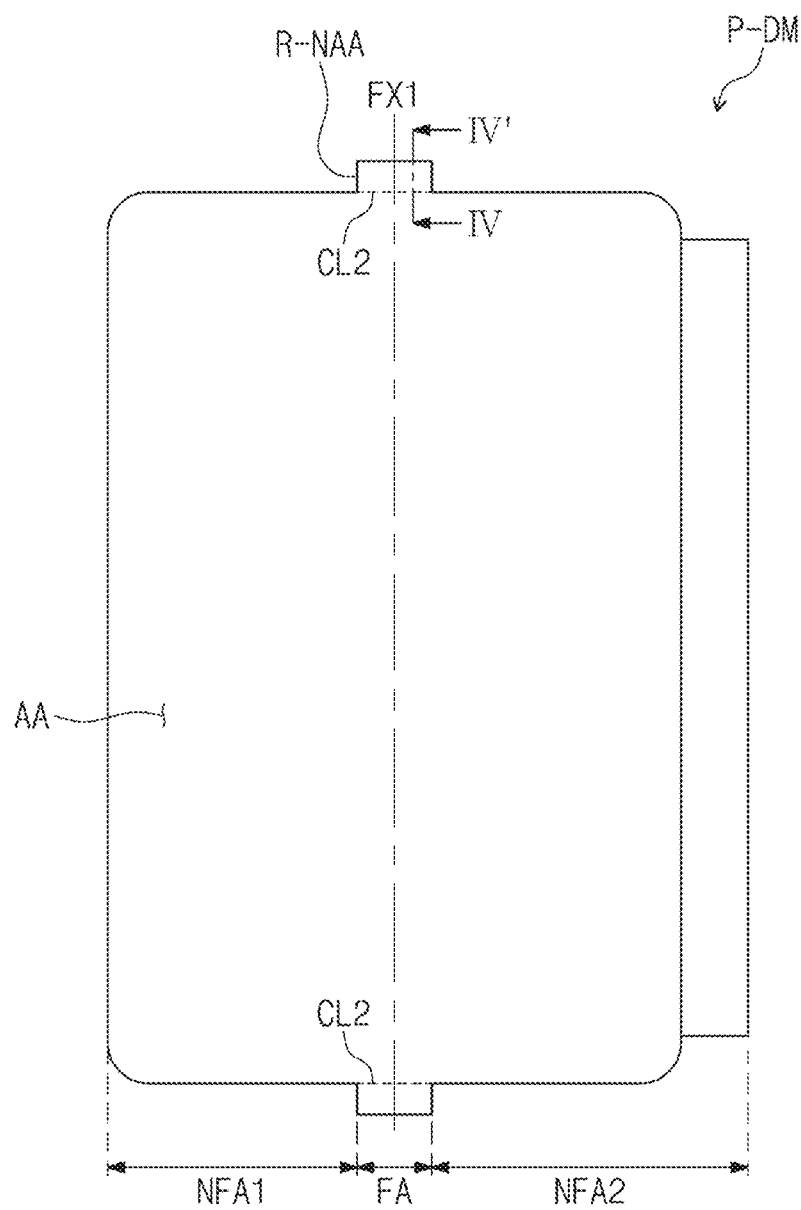
Figure 13C:
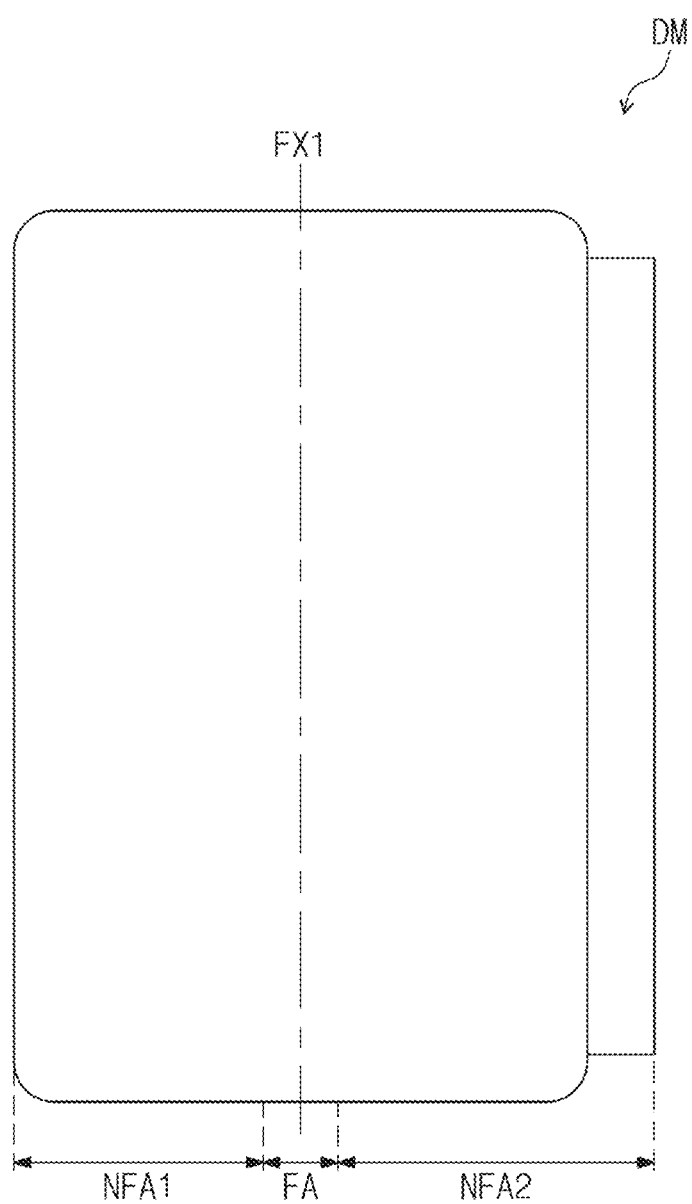
Figure 14A:
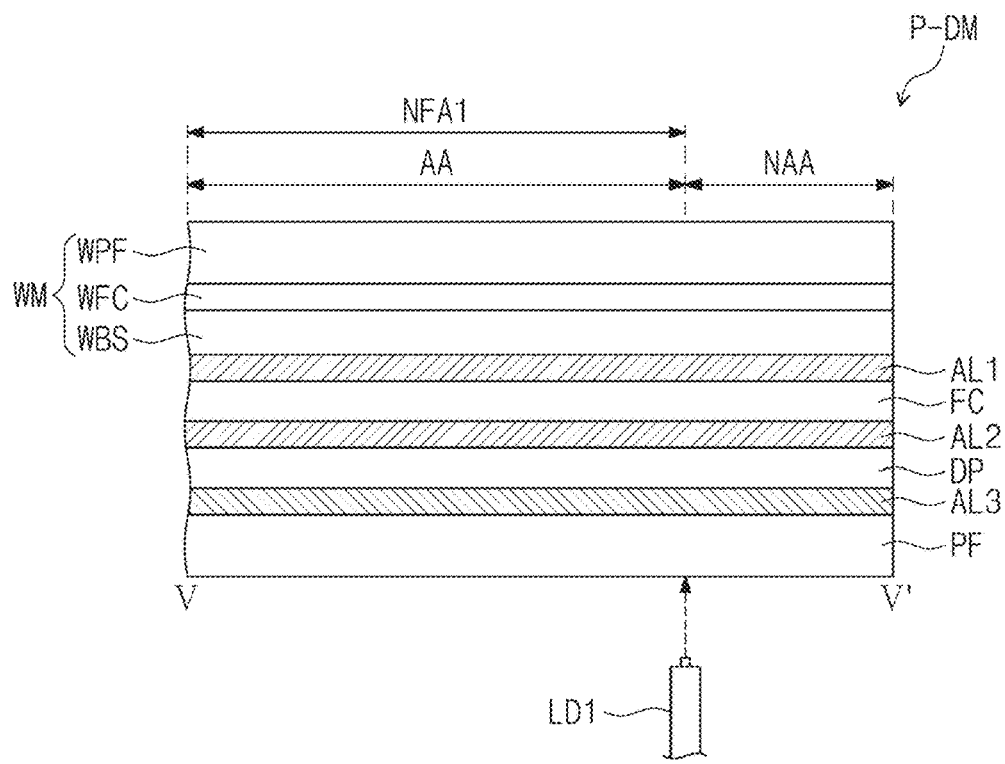
FIGS. 14A and 14B are process views showing a first laser process.
Figure 14B:
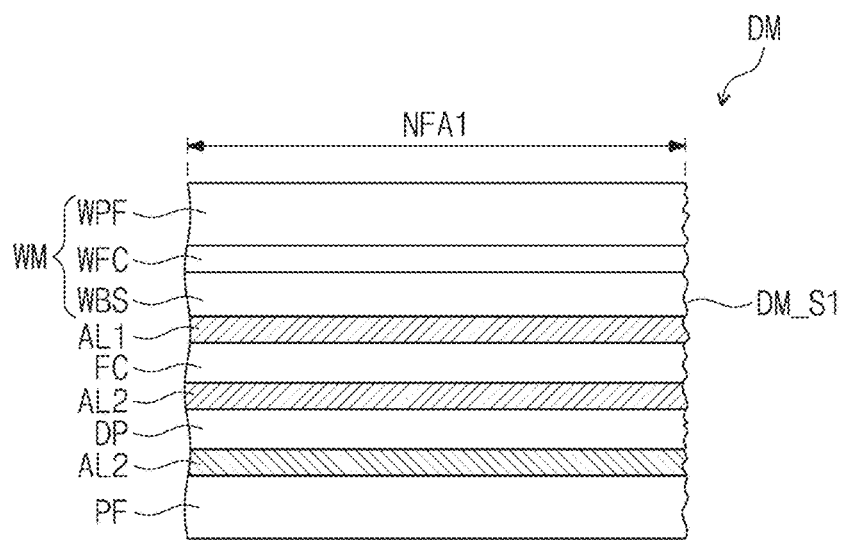
Figure 15A:
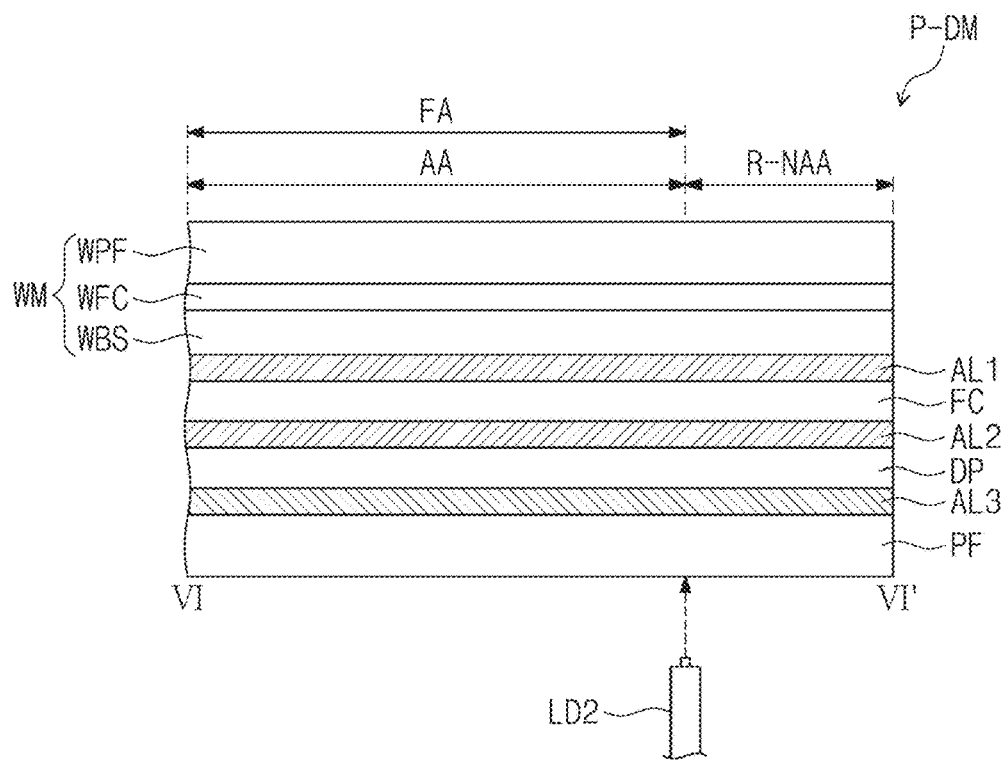
FIGS. 15A and 15B are process views showing a second laser process.
Figure 15B:
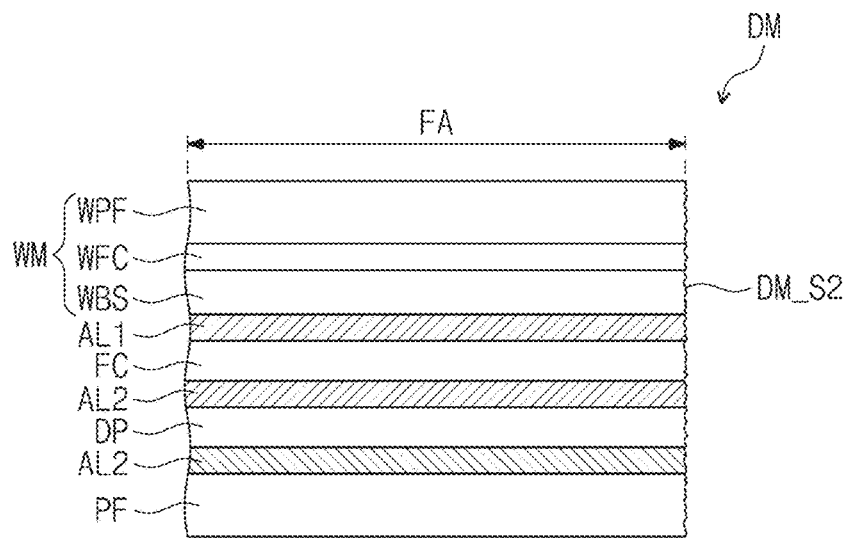

FIGS. 13A to 13C are plan views showing a method of manufacturing a display panel according to an embodiment of the present disclosure. FIGS. 14A and 14B are process views showing a first laser process, and FIGS. 15A and 15B are process views showing a second laser process. For example, FIG. 14A shows a cross-sectional view taken along the line V-V' shown in FIG. 13A, and FIG. 15B shows a cross-sectional view taken along the line VI-VI' shown in FIG. 13B.

Referring to FIG. 13A, a preliminary display module P-DM including a valid area AA and an invalid area NAA, which are distinguished from each other with respect to a cutting line CL, is prepared. When a cutting process is performed along the cutting line CL, the preliminary display module P-DM that includes only the valid area AA may be manufactured. The cutting line CL may include a first cutting line CL1 located in the first and second non-folding areas NFA1 and NFA2, and a second cutting line CL2 located in the folding area FA.

Referring to FIGS. 13A to 14A, the first laser process is performed along the first cutting line CL1 located in the first and second non-folding areas NFA1 and NFA2. The first laser process is performed using a first laser device LD1. The first laser process may include arranging the first laser device LD1 above or below a rear surface of the preliminary display module P-DM, and irradiating a laser beam onto the first cutting line CL1 located in the first and second non-folding areas NFA1 and NFA2. The rear surface of the preliminary display module P-DM may be defined as a surface that is opposite to a front surface that provides the display surface IS (refer to FIG. 1) of the display module DM.

Accordingly, a portion of the invalid area NAA, which is adjacent to the first and second non-folding areas NFA1 and NFA2, may be removed by the first laser process. In this case, the removed portion may be defined as a first portion of the invalid area NAA. As shown in FIG. 14B, after the first laser process, a side surface DM_S1 of the display module DM may be formed in the first and second non-folding areas NFA1 and NFA2.

Referring to FIGS. 13B to 15A, the second laser process is performed along the second cutting line CL2 (see FIG. 13A) located in the folding area FA. After the first laser process, the invalid area NAA remains in the preliminary display module P-DM adjacent to the folding area FA. The remaining invalid area R-NAA may be defined as a second portion of the invalid area NAA.

The second laser process may be performed using a second laser device LD2. The second laser process may include arranging the second laser device LD2 above or below the rear surface of the preliminary display module P-DM, and irradiating a laser beam onto the second cutting line CL2 located in the folding area FA.

Therefore, the remaining invalid area R-NAA located adjacent to the folding area FA may be removed by the second laser process. Then, as shown in FIG. 15B, a side surface DM_S2 of the display module DM may be formed in the folding area FA.

Thus, the preliminary display module P-DM may be cut through the first and second laser processes into the shape of the display module DM employed in the actual display device DD, as shown in FIG. 13C.

The first laser process may be defined as a high energy laser process, and the second laser process may be defined as a low energy laser process. That is, the second laser process may be performed by irradiating the laser beam having a lower energy than that of the laser beam used in the first laser process.

The first laser process may include a process of repeatedly irradiating the laser beam N times. The second laser process may include a process of repeatedly irradiating the laser beam M times. In this case, M may have a value within a range of about 3N to about 3.5N. That is, the number of laser irradiation times in the second laser process may be greater than the number of laser irradiation times in the first laser process (e.g., by a factor of about 3 to about 3.5).

In some embodiments, the first laser device LD1 irradiates the laser beam at a first speed in the first laser process, and the second laser device LD2 irradiates the laser beam at a second speed in the second laser process. The first speed may be different from the second speed. The second speed may be faster than the first speed.

In the present embodiment, different laser devices LD1 and LD2 are used in the first and second laser processes. However, the present disclosure should not be limited thereto or thereby. That is, in other embodiments, the first and second laser processes may be performed by the same laser device, and in this case, the energy of the laser beam used in the first laser process may be set to differ from that of the laser beam used in the second laser process.

As described above, when the preliminary display module P-DM is cut by using the laser process, the preliminary display module P-DM is cut by using the high energy in the non-folding areas NFA1 and NFA2, and the preliminary display module P-DM is cut using the low energy in the folding area FA. Accordingly, the stress applied to the side surface DM_S2 of the folding area FA, and the damage caused to the side surface DM_S2 of the folding area FA, during the cutting process may be reduced. Therefore, defects, such as cracks, which have resulted from stress and damage applied to the side surface DM_S2 due to the repeated folding operations, may be reduced. As a result, a product reliability of the foldable display device may be improved.

Although the embodiments of the present disclosure have been described, it is understood that the present disclosure should not be limited to these embodiments, and that various changes and modifications can be made by one ordinary skilled in the art within the spirit and scope of the present disclosure as hereinafter claimed. Therefore, the disclosed subject matter should not be limited to any single embodiment described herein, and the scope of the present inventive concept shall be determined according to the attached claims, with functional equivalents thereof to be included therein.

What is claimed is:

1. A method of manufacturing a display device comprising a display panel for displaying an image, and comprising a folding area configured to be folded about a folding axis and a non-folding area adjacent to the folding area, and a window on the display panel, comprising a flexible material, configured to be folded along the display panel, and having a first side surface portion of the window in the non-folding area having a first surface roughness, and a second side surface portion of the window in the folding area having a second surface roughness that is less than the first surface roughness, the method comprising:
preparing a preliminary display module comprising a valid area and an invalid area, which are distinguished from each other with respect to a cutting line;
performing a first laser process along a first cutting line in the non-folding area of the cutting line to separate a first portion of the invalid area from the valid area; and
performing a second laser process along a second cutting line in the folding area of the cutting line to separate a second portion of the invalid area from the valid area,
wherein performing the second laser process comprises irradiating a second laser beam having an energy that is different from a first laser beam used in the first laser process.

2. The method of claim 1, wherein performing the first laser process comprises repeatedly irradiating the first laser beam N times, wherein performing the second laser process comprises repeatedly irradiating the second laser beam M times, M having a value within a range from about 3N to about 3.5N.

3. The method of claim 1, wherein performing the first laser process comprises irradiating the first laser beam at a first speed, and
wherein performing the second laser process comprises irradiating the second laser beam at a second speed that is faster than the first speed.

4. The method of claim 1, wherein performing the first laser process comprises irradiating the first laser beam along the first cutting line on a rear surface of the preliminary display module, and
wherein performing the second laser process comprises irradiating the second laser beam along the second cutting line on the rear surface of the preliminary display module.

5. The method of claim 1, wherein a side surface of the window has a first surface roughness in the non-folding area and has a second surface roughness in the folding area that is less than the first surface roughness.

6. The method of claim 5, wherein the window comprises layers sequentially stacked in a stacking direction, and wherein a surface roughness of the side surface of the window is higher in the non-folding area than in the folding area.

7. The method of claim 6, wherein a side surface of at least one layer among the layers is located at a first height range from a reference surface that is substantially parallel to the stacking direction in the non-folding area, and is located at a second height range from the reference surface in the folding area, the second height range being less than the first height range.

8. The method of claim 5, wherein the window comprises:
a base layer;
a window functional layer on the base layer; and
a window protective layer covering the window functional layer.

9. The method of claim 8, wherein the side surface of the window comprises a side surface of the base layer, a side surface of the window functional layer, and a side surface of the window protective layer.

10. The method of claim 5, wherein the display device further comprises a functional layer between the display panel and the window, a side surface of the functional layer having a surface roughness in the folding area that is lower than a surface roughness in the non-folding area.

* * * * *